(12) United States Patent
Starrett

(10) Patent No.: US 8,956,061 B2
(45) Date of Patent: Feb. 17, 2015

(54) COMPACT KEYBOARD AND CRADLE

(75) Inventor: Scott Starrett, Los Angeles, CA (US)

(73) Assignee: Cervantes Mobile, Los Angeles, CA (US)

( * ) Notice: Subject to any disclaimer, the term of this patent is extended or adjusted under 35 U.S.C. 154(b) by 288 days.

(21) Appl. No.: 13/171,593

(22) Filed: Jun. 29, 2011

(65) Prior Publication Data

US 2012/0009000 A1    Jan. 12, 2012

Related U.S. Application Data

(63) Continuation-in-part of application No. 29/365,498, filed on Jul. 9, 2010, now Pat. No. Des. 671,942.

(60) Provisional application No. 61/362,130, filed on Jul. 7, 2010.

(51) Int. Cl.
| | | |
|---|---|---|
| *G06F 3/02* | (2006.01) | |
| *G06F 3/023* | (2006.01) | |
| *G06F 1/16* | (2006.01) | |

(52) U.S. Cl.
CPC ............ *G06F 3/0231* (2013.01); *G06F 1/1632* (2013.01); *G06F 3/0221* (2013.01); *G06F 3/023* (2013.01)
USPC .................. 400/472; 361/679.15; 361/679.16

(58) Field of Classification Search
CPC .. G06F 3/0221; H01H 13/86; H01H 2223/05; H01H 2223/052
USPC .......................... 400/472; 361/679.15, 679.16
See application file for complete search history.

(56) References Cited

U.S. PATENT DOCUMENTS

| | | | |
|---|---|---|---|
| 3,940,758 A | 2/1976 | Margolin | |
| 5,502,460 A | 3/1996 | Bowen | |
| 5,748,114 A | 5/1998 | Koehn | |
| 5,805,415 A | 9/1998 | Tran et al. | |
| 5,859,762 A * | 1/1999 | Clark et al. | ............... 361/679.41 |
| 5,995,025 A | 11/1999 | Sternglass et al. | |
| 6,025,986 A | 2/2000 | Sternglass et al. | |
| 6,174,097 B1 | 1/2001 | Daniel | |
| 6,256,017 B1 | 7/2001 | Bullister | |
| 6,258,017 B1 | 7/2001 | Singh | |

(Continued)

FOREIGN PATENT DOCUMENTS

| | | | |
|---|---|---|---|
| CH | 686 911 | 7/1996 | |
| CN | 201054115 Y * | 4/2008 | ................ G06F 3/02 |

OTHER PUBLICATIONS

International Search Report of PCT/US11/42287 dated Nov. 14, 2011.

*Primary Examiner* — Daniel J Colilla
(74) *Attorney, Agent, or Firm* — Cowan, Liebowitz & Latman, P.C.; Steven D. Underwood

(57) ABSTRACT

One exemplary aspect comprises a keyboard apparatus comprising: a collapsible keyboard comprising five substantially rigid frames, the frames comprising a central frame, two end frames, and two intermediate frames, each intermediate frame located between an end frame and the central frame; each pair of adjacent frames being relatively pivotably connected together along a folding axis, the folding axes being substantially mutually parallel; and a plurality of keys mounted on the frames. Another exemplary aspect comprises a keyboard apparatus as above, further comprising a collapsible cradle assembly detachable from the collapsible keyboard.

19 Claims, 39 Drawing Sheets

(56) References Cited

U.S. PATENT DOCUMENTS

| | | |
|---|---|---|
| D448,032 S | 9/2001 | Talley |
| 6,331,850 B1 | 12/2001 | Olodort et al. |
| D457,525 S | 5/2002 | Olodort et al. |
| 6,675,647 B2 | 1/2004 | Marioni |
| D486,488 S | 2/2004 | Olodort et al. |
| 6,734,809 B1 | 5/2004 | Olodort et al. |
| 6,774,888 B1 | 8/2004 | Genduso |
| 6,839,002 B2 | 1/2005 | Olodort et al. |
| 6,894,626 B2 | 5/2005 | Olodort et al. |
| 6,980,423 B2 | 12/2005 | Tanaka et al. |
| D530,716 S | 10/2006 | Kimura et al. |
| 7,193,614 B2 | 3/2007 | Bullister |
| D557,263 S | 12/2007 | Griffin |
| 2002/0001498 A1 | 1/2002 | Li et al. |
| 2002/0097226 A1 | 7/2002 | Chen |
| 2003/0048595 A1 | 3/2003 | Hsieh et al. |
| 2003/0099086 A1 | 5/2003 | Chuang |
| 2004/0066373 A1 | 4/2004 | Wu |
| 2004/0169593 A1 | 9/2004 | Olodort et al. |
| 2004/0228668 A1 | 11/2004 | Hsu |
| 2005/0164752 A1 | 7/2005 | Lau et al. |
| 2005/0212772 A1* | 9/2005 | Mochizuki et al. ........... 345/168 |
| 2006/0099023 A1 | 5/2006 | Katz et al. |
| 2006/0192689 A1* | 8/2006 | Wang et al. .................... 341/22 |
| 2007/0102612 A1* | 5/2007 | Seil et al. .................. 248/311.2 |
| 2007/0222758 A1* | 9/2007 | Mulcahy et al. .............. 345/168 |
| 2008/0075518 A1 | 3/2008 | Large |
| 2008/0180398 A1 | 7/2008 | Kim et al. |
| 2009/0218454 A1 | 9/2009 | Stanley |
| 2009/0257807 A1* | 10/2009 | Woloschyn .................. 400/489 |
| 2011/0057083 A1* | 3/2011 | Carnevali ................... 248/274.1 |
| 2011/0127190 A1* | 6/2011 | Bardwell et al. .............. 206/561 |
| 2013/0107438 A1* | 5/2013 | Lee et al. ................. 361/679.08 |

\* cited by examiner

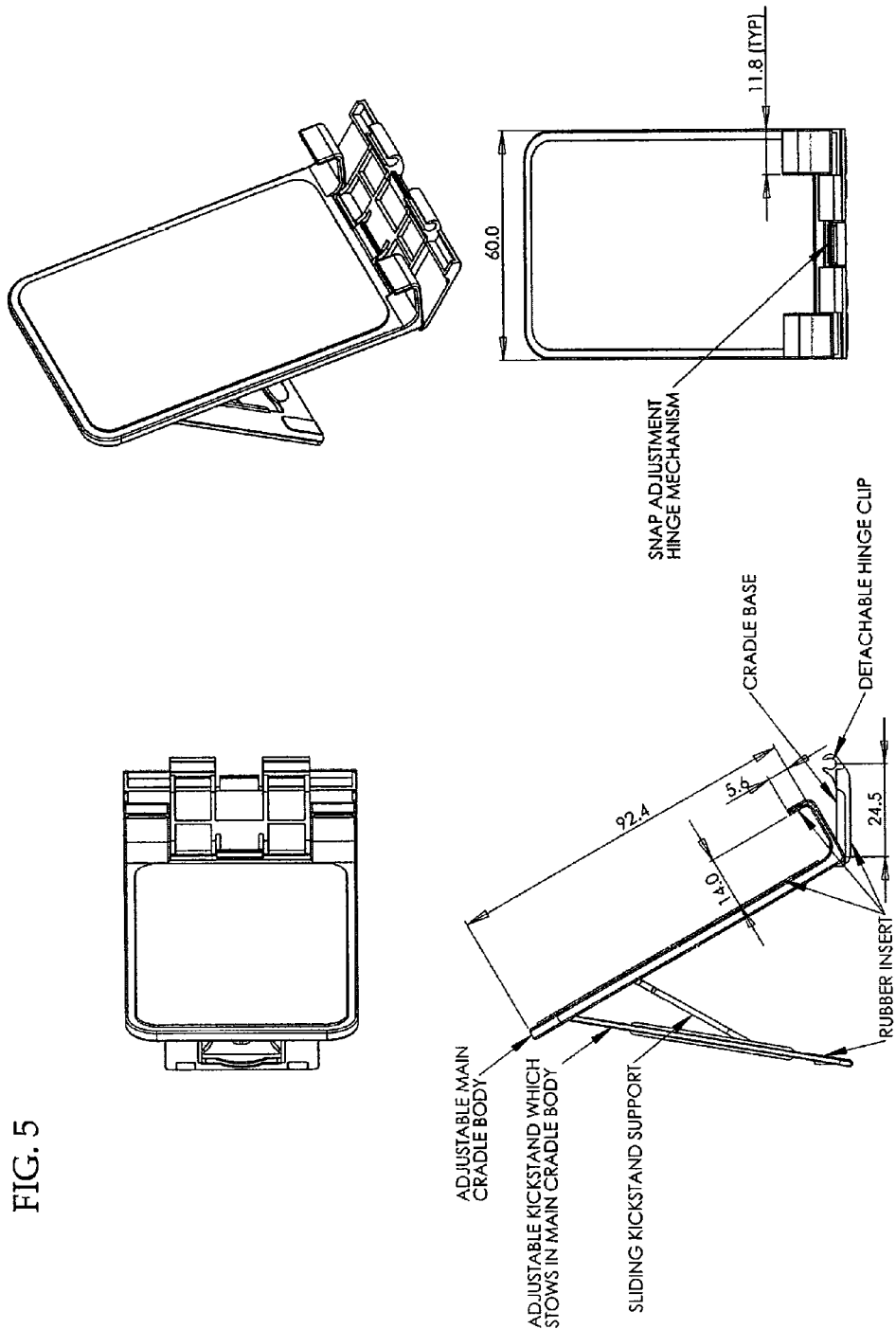

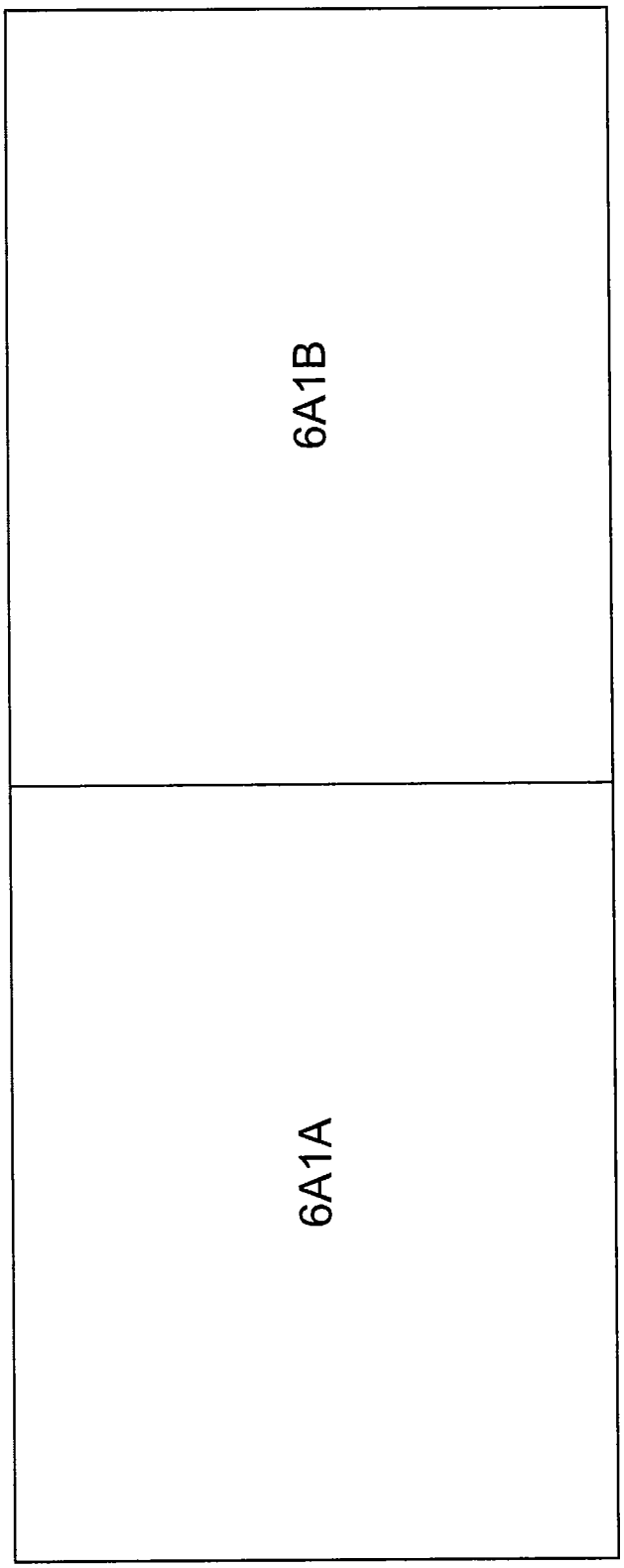

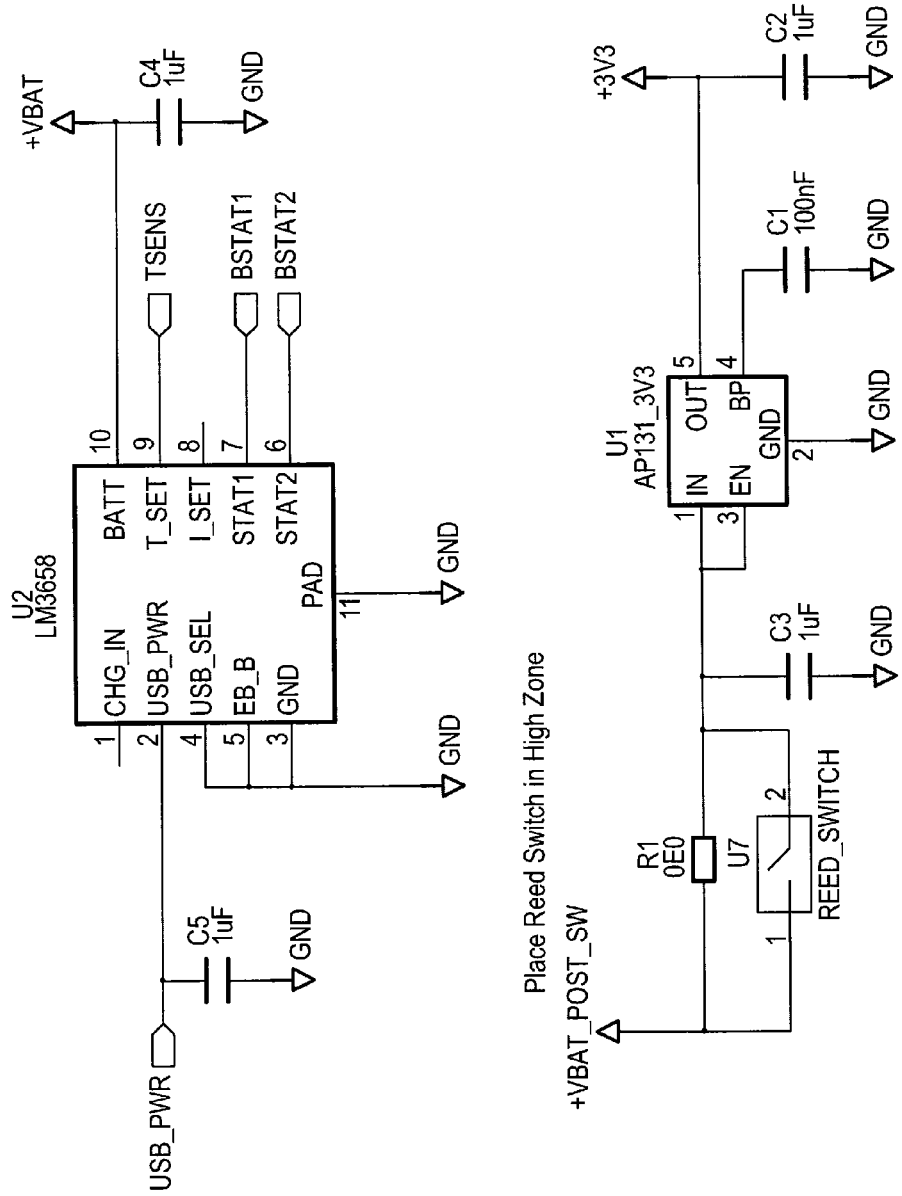
FIG. 6A1A

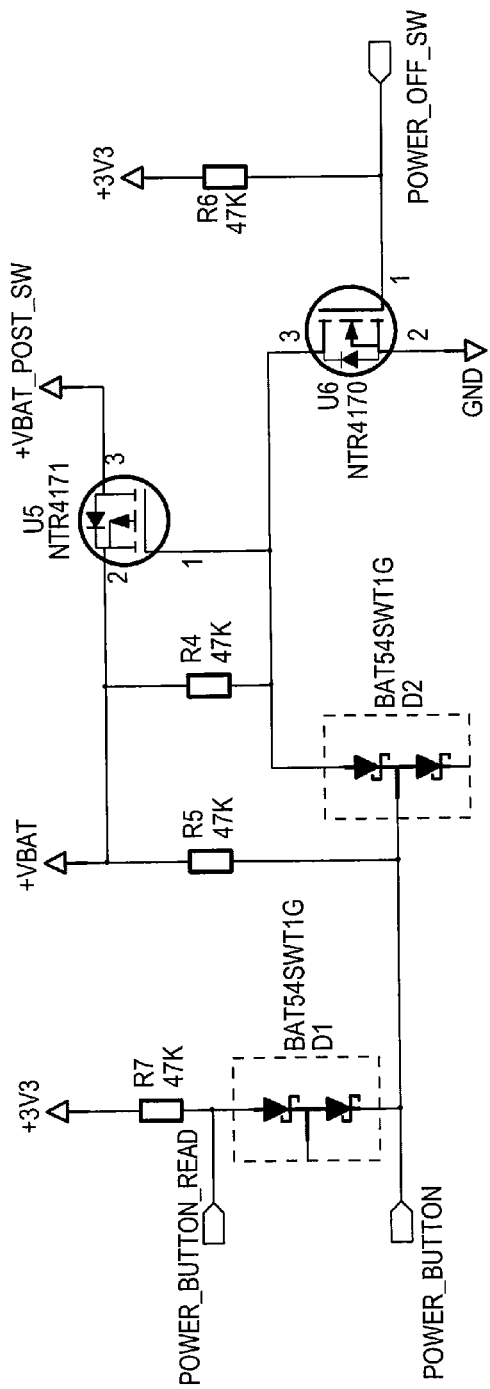
FIG. 6A1B

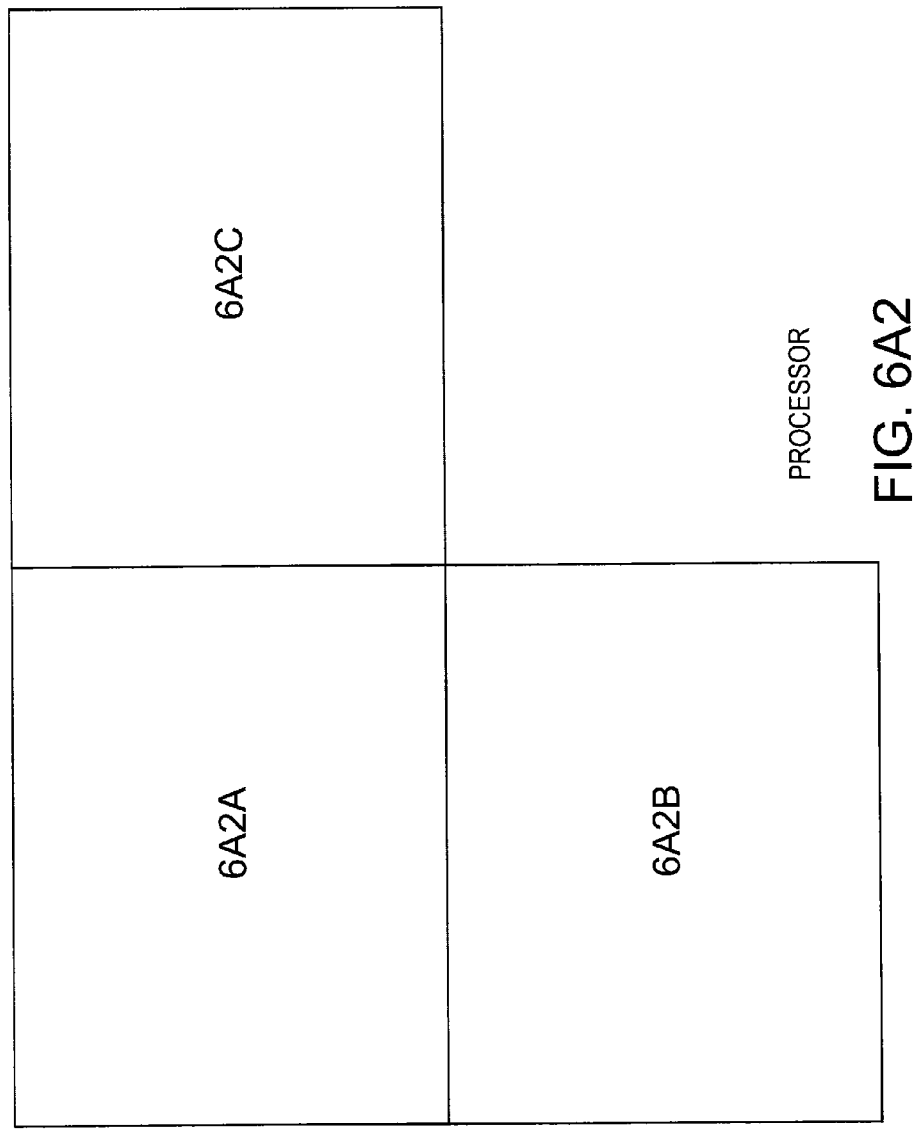
FIG. 6A2

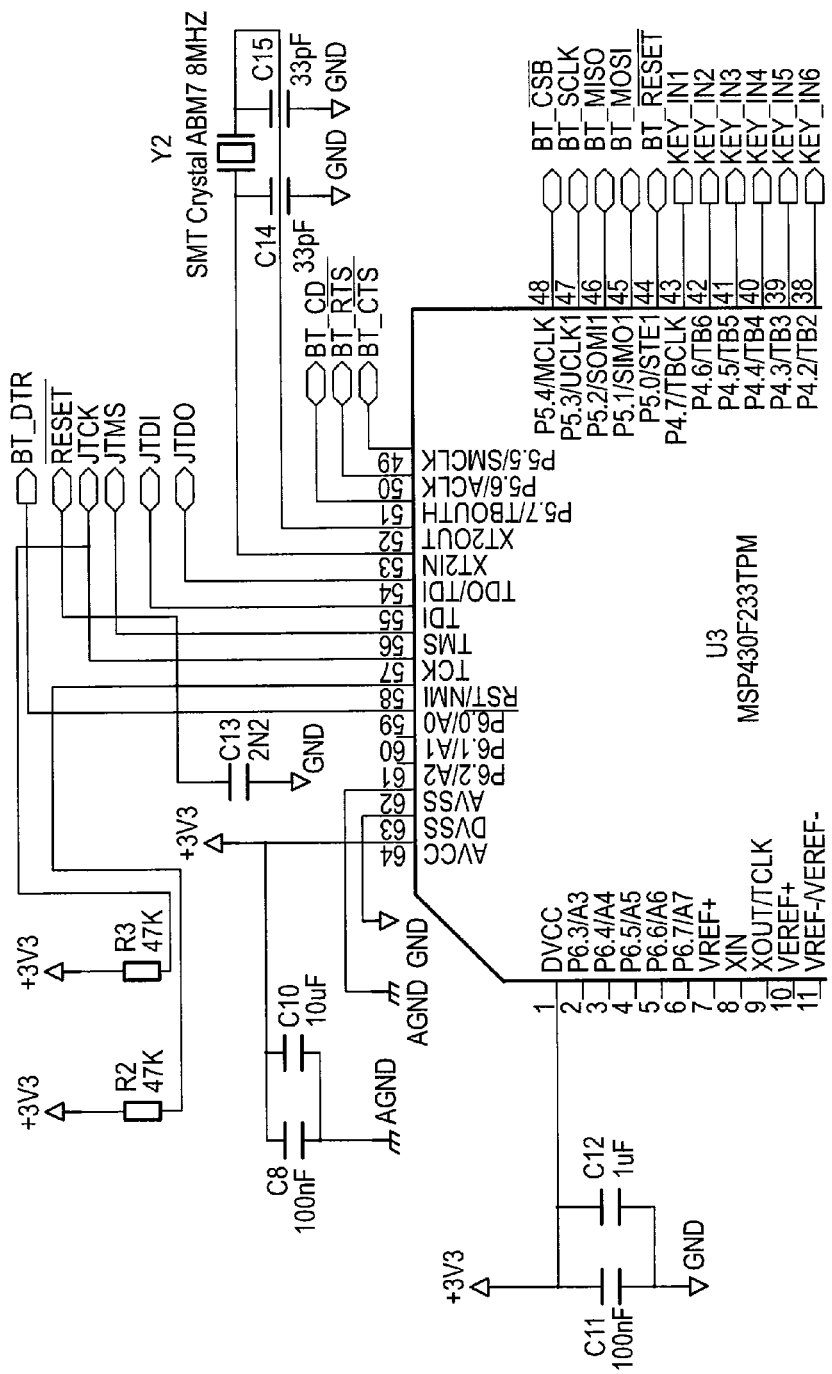
FIG. 6A2A

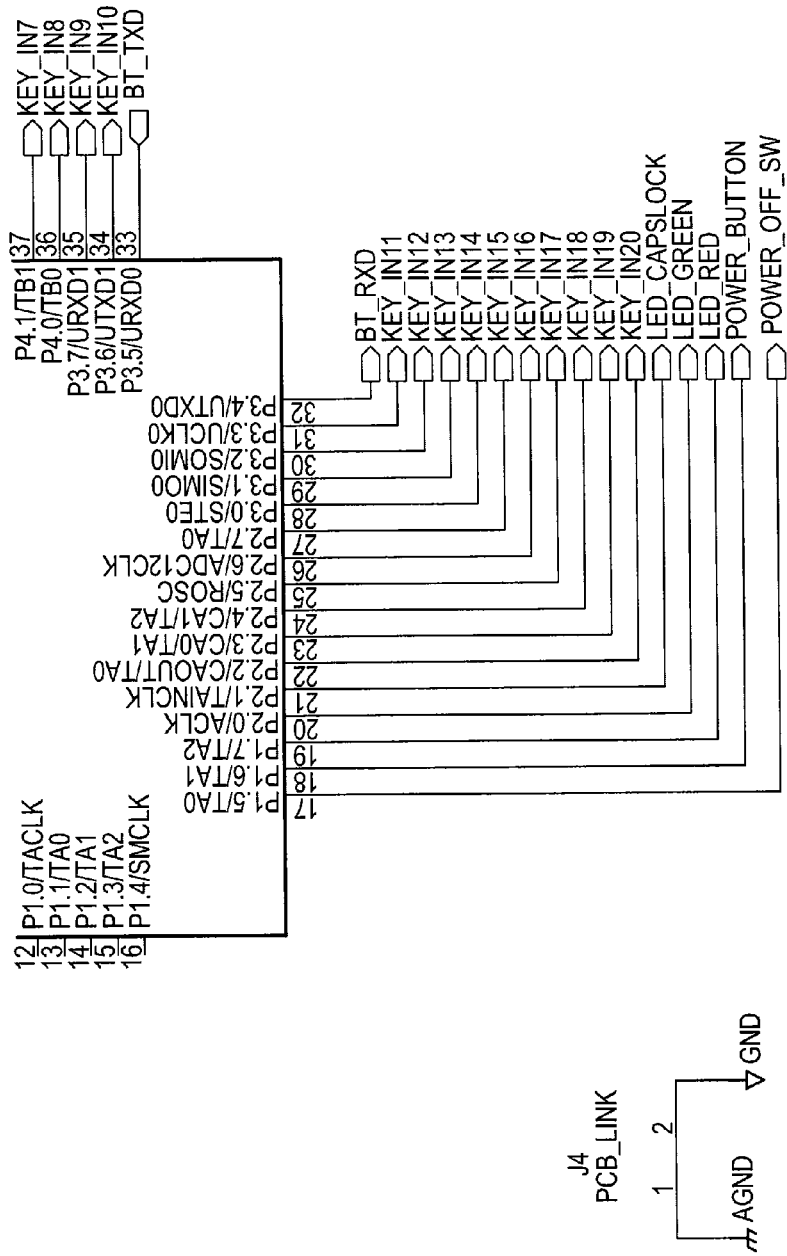
FIG. 6A2B

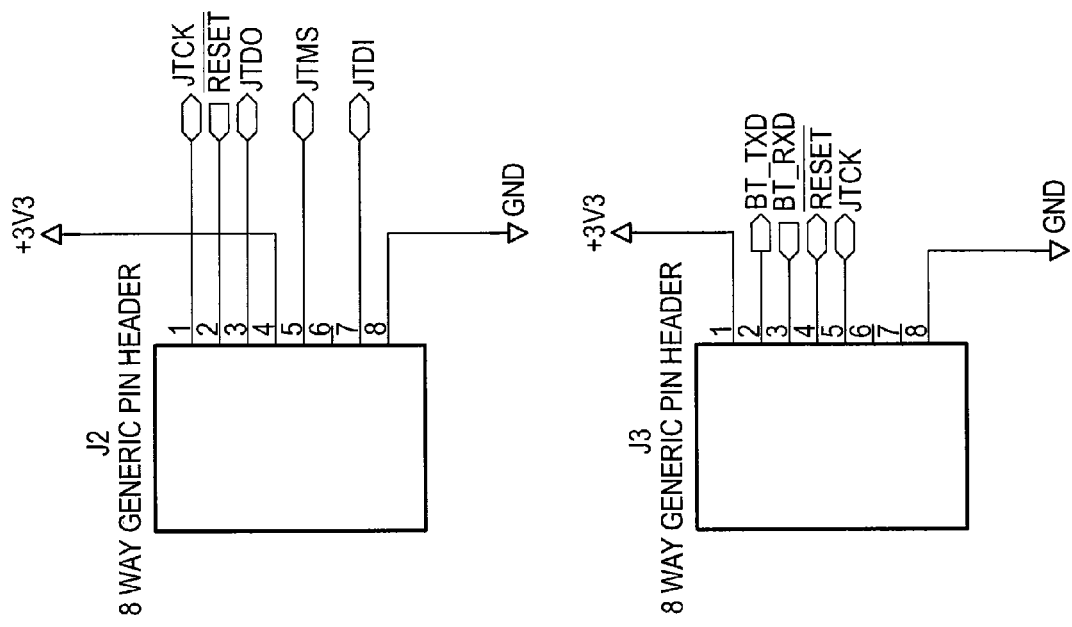
FIG. 6A2C

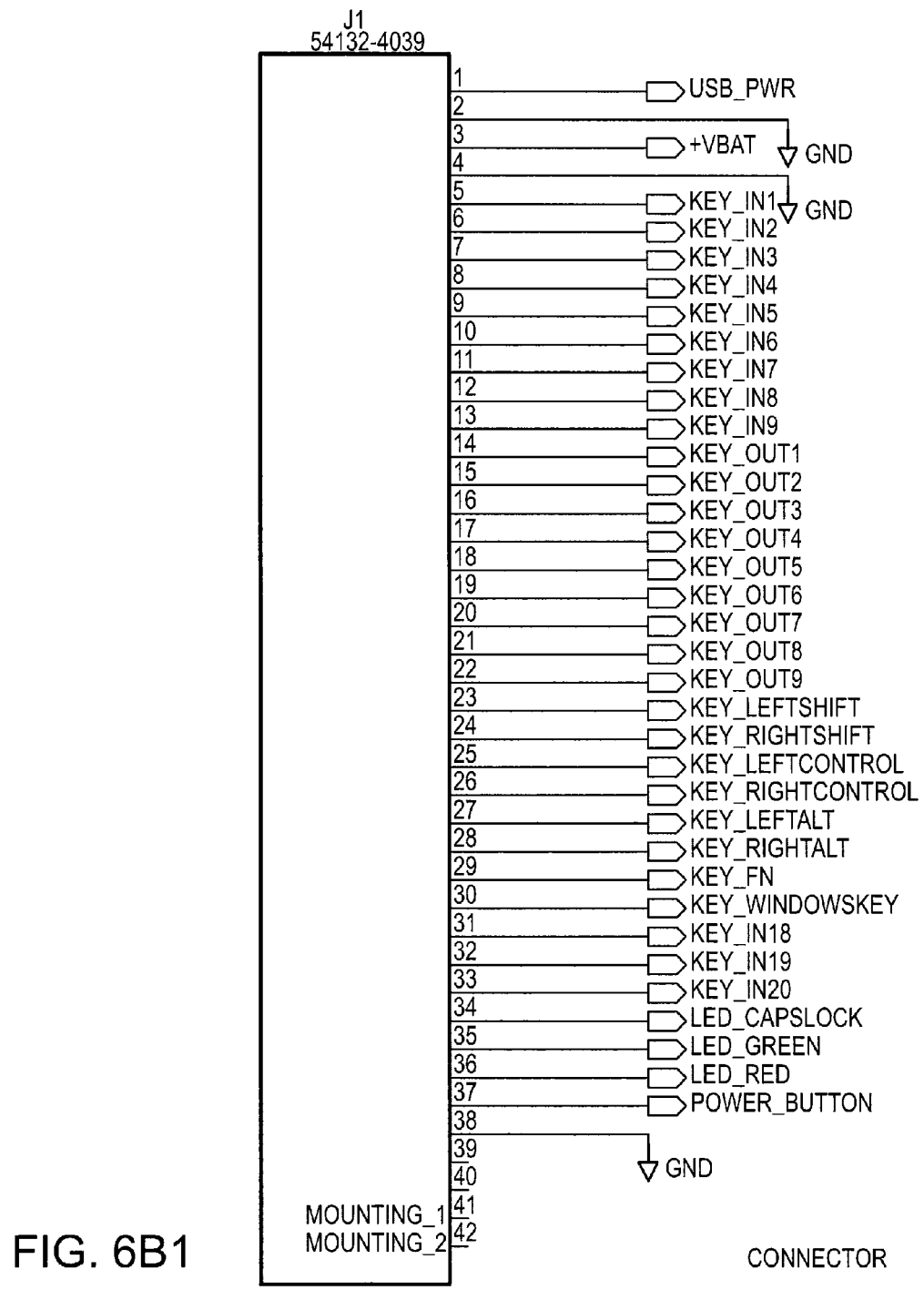
FIG. 6B1

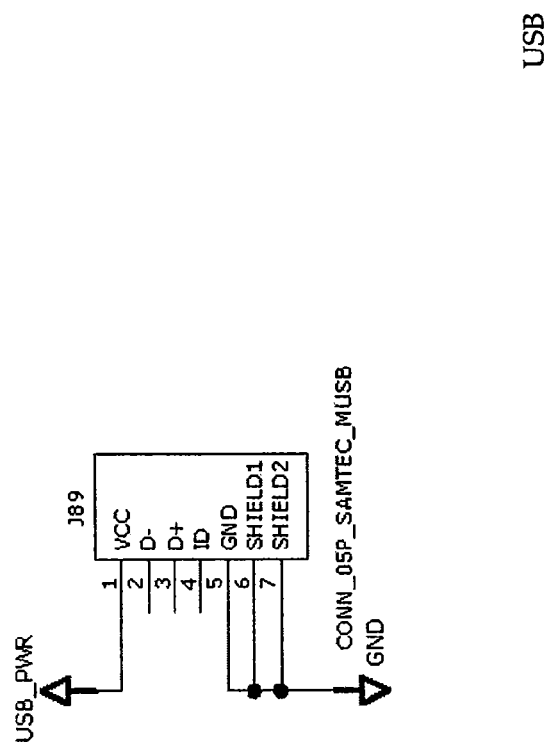
FIG. 6B2

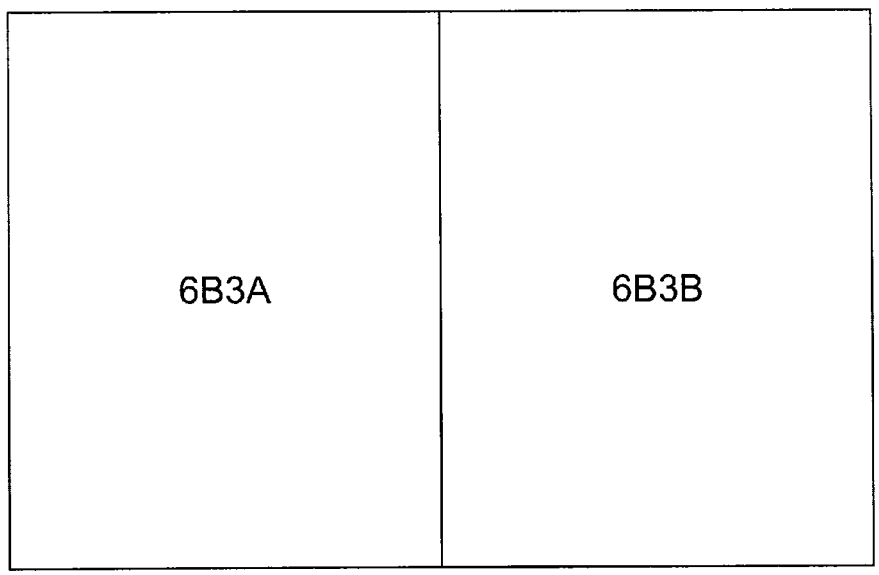
KEY MATRIX
FIG. 6B3

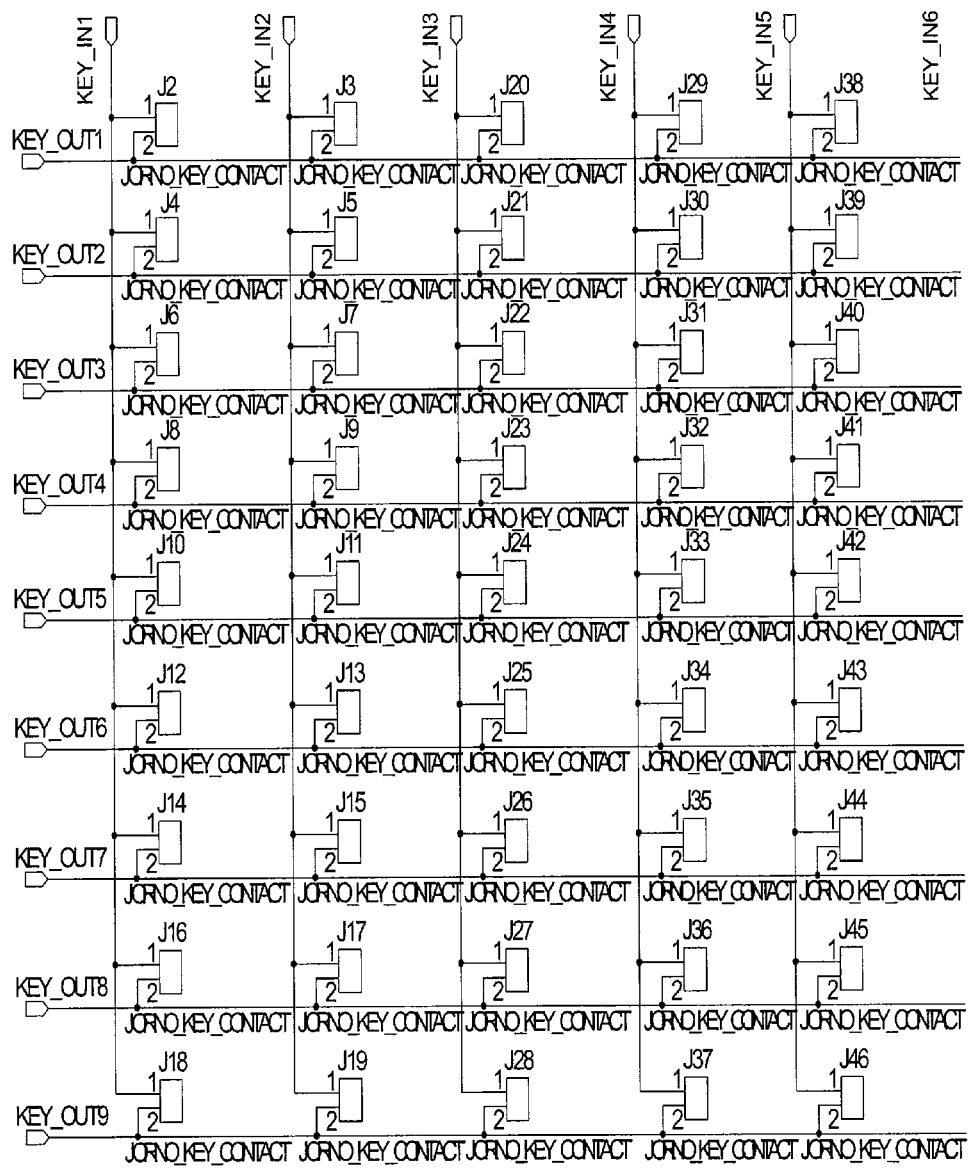
FIG. 6B3A

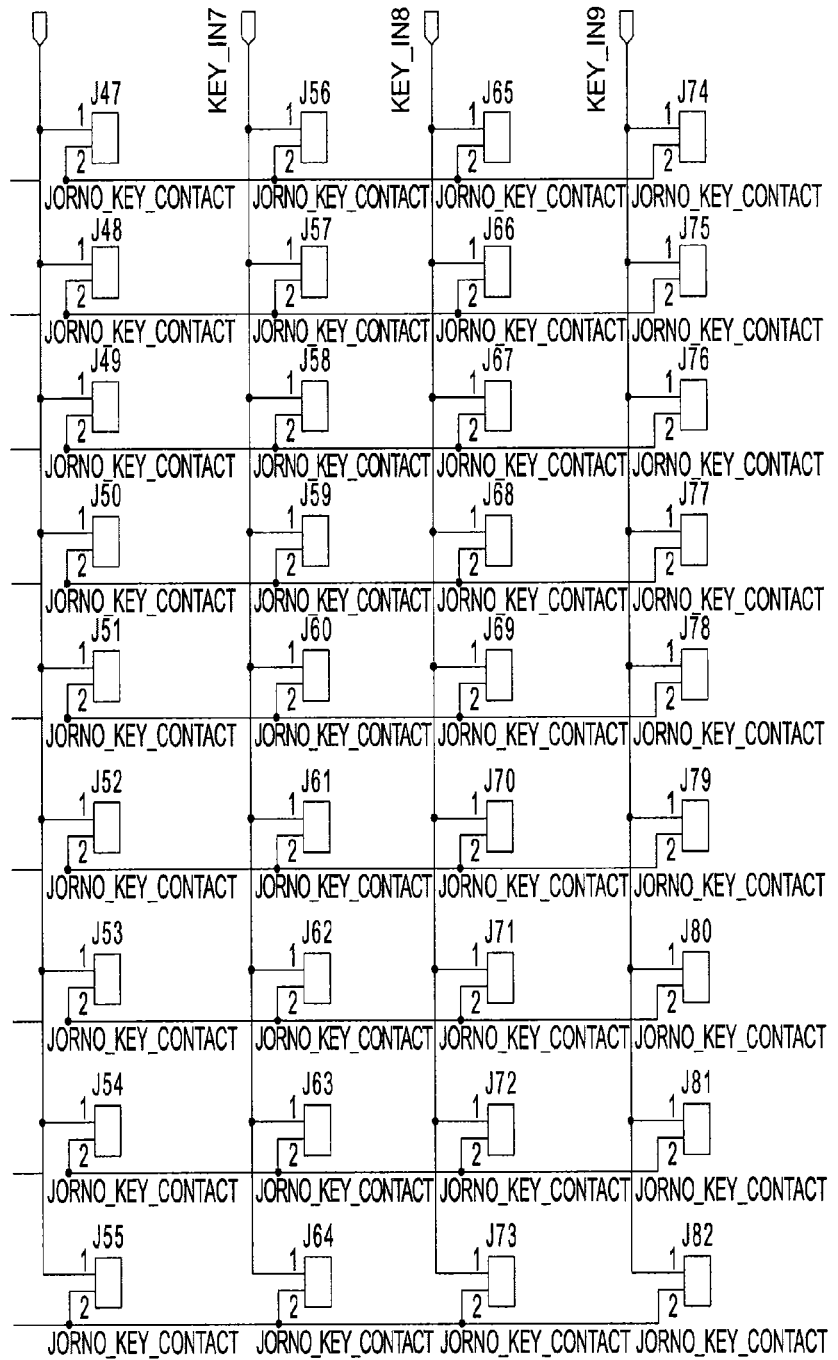
FIG. 6B3B

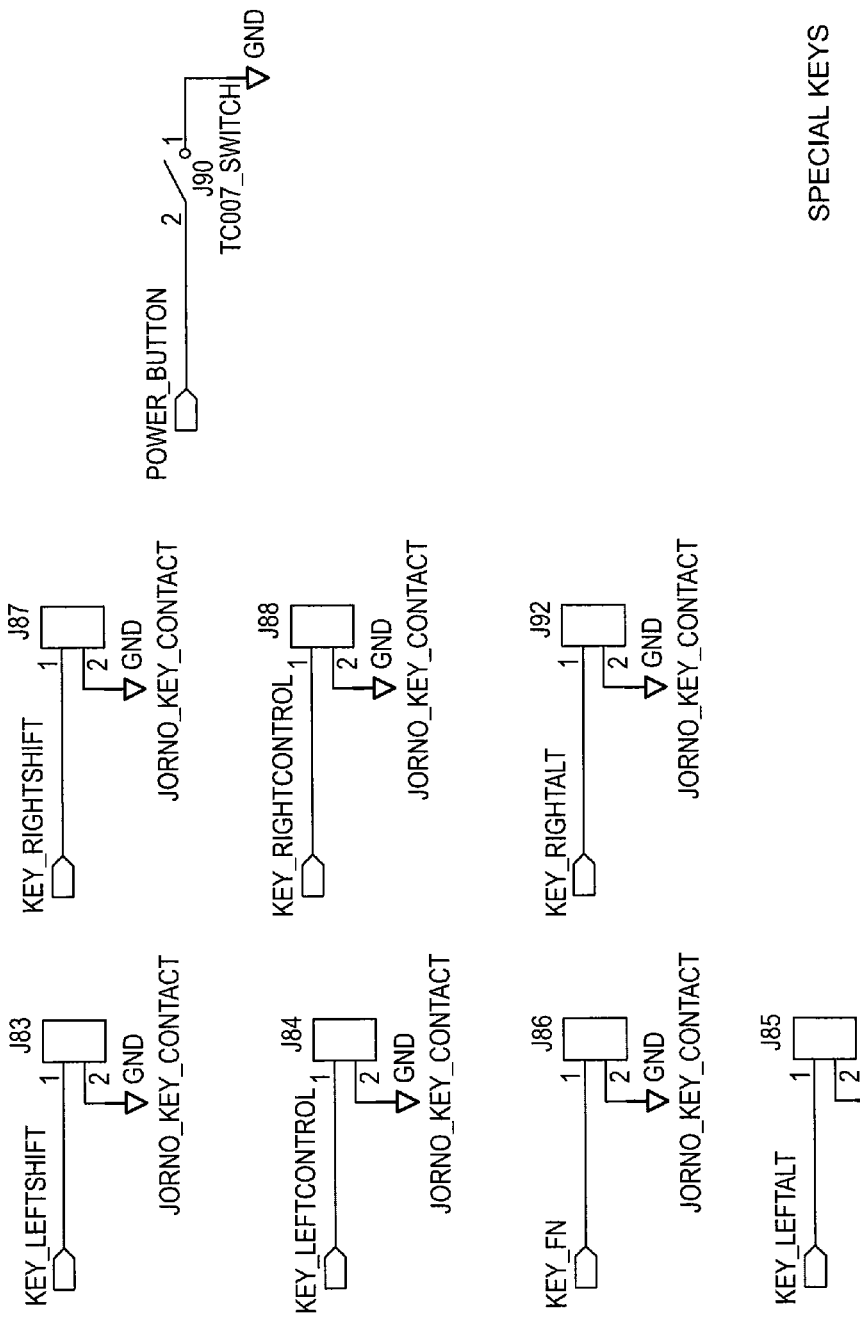
FIG. 6B4

FIG. 6B5

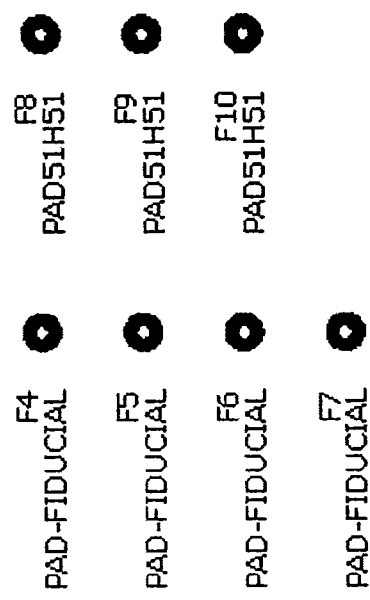
FIG. 6B6

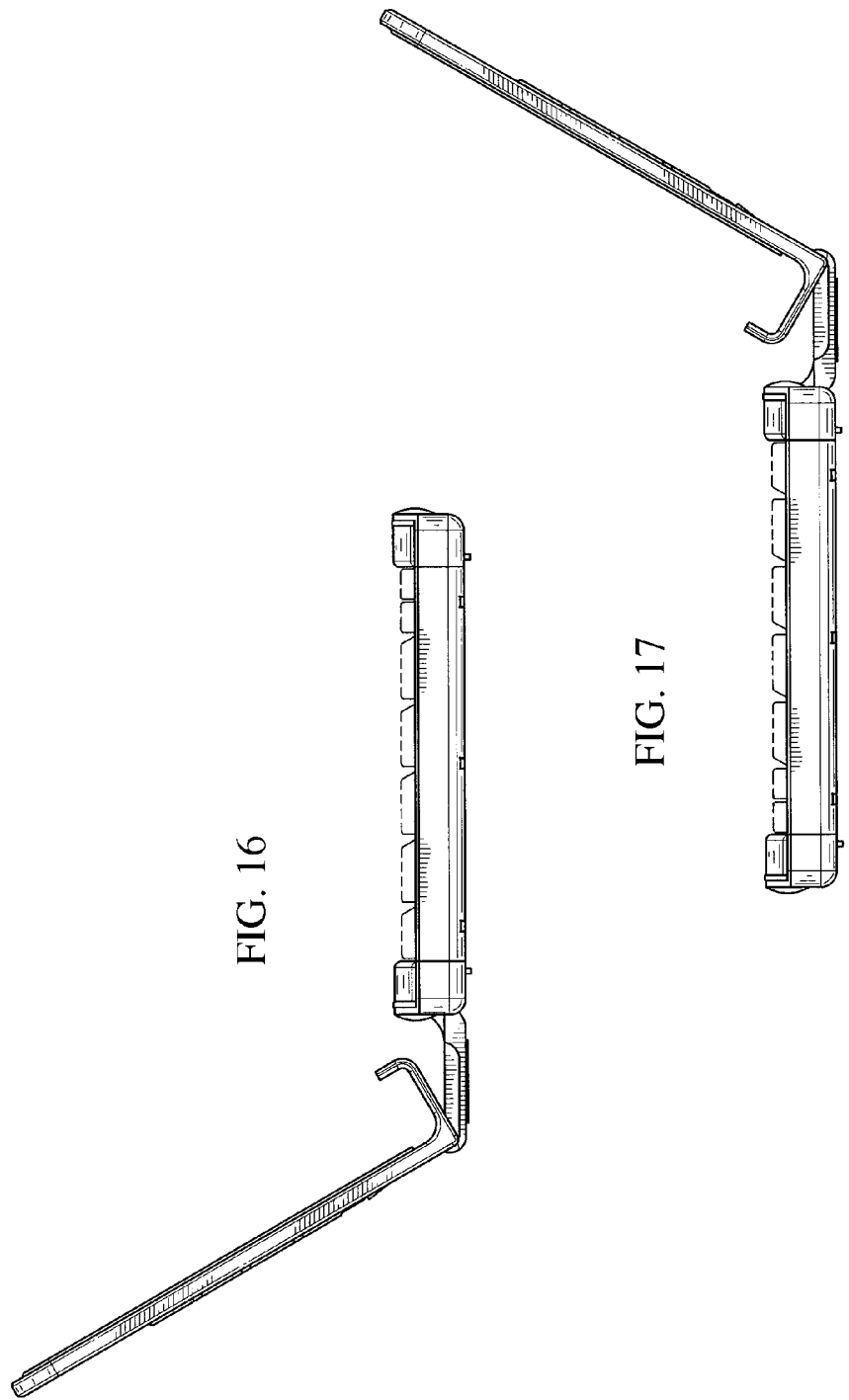

COMPACT KEYBOARD AND CRADLE

CROSS-REFERENCE TO RELATED APPLICATIONS

This application claims priority to U.S. Provisional Patent Application No. 61/362,130, entitled "Compact Keyboard," filed on Jul. 7, 2010, and is a continuation-in-part of U.S. Design Patent App. No. 29/365,498, entitled "Keyboard and Stand," filed on Jul. 9, 2010 now U.S. Pat. No. Des. 671,942. The entire contents of each of the above-referenced applications are incorporated herein by reference.

INTRODUCTION

Exemplary embodiments relate to improved means of input for portable computing devices and computers. More specifically, such embodiments relate to improved character (e.g., ASCII) input productivity to portable computing devices (e.g., mobile phones, tablet computers, handheld computers and other computers).

Current input means are deficient. As portable computing devices become smaller and more powerful, users want to be productive with their devices wherever they may be. Users struggle with being productive using the current touch-screen keyboard or thumb-keyboards of small devices. What is needed is a pocket-size keyboard that interfaces with multiple devices.

One or more embodiments described herein:

Provide a compact physical keyboard for input into portable computing devices.

Provide a cradle/stand to hold/secure a portable computing device.

Provide a Bluetooth or wired connection to a portable computing device.

Provide backup battery power to a portable computing device.

However, those skilled in the art will appreciate that the invention is not limited by the above features, and that various embodiments may provide all, none, or a subset of the above-described features without departing from the scope of the invention.

One exemplary aspect comprises a keyboard apparatus comprising: (a) a collapsible keyboard comprising five substantially rigid frames, the frames comprising a central frame, two end frames, and two intermediate frames, each intermediate frame located between an end frame and the central frame; (b) each pair of adjacent frames being relatively pivotably connected together along a folding axis, the folding axes being substantially mutually parallel; and (c) a plurality of keys mounted on the frames; the collapsible keyboard being foldable about the folding axes between a deployed configuration, in which the keyboard is generally planar, and a collapsed configuration, in which the end frames are located between the central frame and the intermediate frames.

In various exemplary embodiments: (1) the keyboard is foldable in the same direction on folding axes adjacent to an intermediate frame; (2) each intermediate frame is pivotably connected to an end frame with a single hinge, and pivotably connected to the central frame with a double hinge; (3) the single hinges are centered between the double hinges when the keyboard is in the collapsed configuration; (4) each intermediate frame has a width, as measured between adjacent folding axes, that is less than one half of the width of the central frame; (5) each frame having a side wall shaped to nest with an adjacent side wall when the keyboard is in the deployed configuration, and each sidewall having either a magnet or a magnet contact face; (6) each end frame has a width, as measured from an adjacent folding axis, that is less than the width of an adjacent intermediate frame; (7) the plurality of keys are arranged in a standard stair-step QWERTY layout; (8) the plurality of keys are arranged in a standard ISO, ANSI, or JIS layout; (9) the apparatus further comprises a comb and membrane for preventing particles from entering the keyboard; (10) the apparatus further comprises a Bluetooth interface operable to communicate with a mobile computing or communication device; (11) the apparatus further comprises a charging port and battery operable to charge a mobile computing or communication device; and/or (12) the apparatus further comprises one or more USB ports.

In various other exemplary embodiments: (1) the apparatus further comprises a cradle assembly; (2) the cradle assembly is detachable from the collapsible keyboard; (3) the cradle assembly is operable to cradle a cellphone and to cradle a large mobile computing or communication device; (4) the cradle assembly comprises a stowing kickstand, a cradle foot, and a rubberized surface; (5) the kickstand is adjustable to display a mobile computing or communication device at a plurality of angles; (6) the cradle assembly is collapsible; (7) the cradle assembly comprises a detachable hinge clip; and/or (8) the cradle assembly comprises a snap adjustment hinge mechanism.

Another exemplary aspect comprises a keyboard apparatus comprising: (a) a collapsible keyboard comprising five substantially rigid frames, the frames comprising a central frame, two end frames, and two intermediate frames, each intermediate frame located between an end frame and the central frame; (b) each pair of adjacent frames being relatively pivotably connected together along a folding axis, the folding axes being substantially mutually parallel; and (c) a plurality of keys mounted on the frames.

Another exemplary aspect comprises a keyboard apparatus comprising: (a) a collapsible keyboard comprising five substantially rigid frames, the frames comprising a central frame, two end frames, and two intermediate frames, each intermediate frame located between an end frame and the central frame; (b) each pair of adjacent frames being relatively pivotably connected together along a folding axis, the folding axes being substantially mutually parallel; (c) a plurality of keys mounted on the frames; and (d) a collapsible cradle assembly detachable from the collapsible keyboard; the collapsible keyboard being foldable about the folding axes between a deployed configuration, in which the keyboard is generally planar, and a collapsed configuration, in which the end frames are located between the central frame and the intermediate frames, and the cradle assembly comprising a stowing kickstand, a cradle foot, and a rubberized surface.

Another exemplary aspect comprises a keyboard apparatus comprising: (a) a collapsible keyboard comprising five substantially rigid frames, the frames comprising a central frame, two end frames, and two intermediate frames, each intermediate frame located between an end frame and the central frame; (b) each pair of adjacent frames being relatively pivotably connected together along a folding axis, the folding axes being substantially mutually parallel; and (c) a plurality of keys mounted on the frames and arranged in a standard stair-step ISO, ANSI, or JIS layout; the collapsible keyboard being foldable about the folding axes between a deployed configuration, in which the keyboard is generally planar, and a collapsed configuration, in which the end frames are located between the central frame and the intermediate frames.

Other aspects and embodiments will be apparent to those skilled in the art after reviewing the description below.

BRIEF DESCRIPTION OF THE DRAWINGS

FIG. 5 depicts an exemplary cradle embodiment.

FIG. 6 (6A1, 6A1A, 6A1B, 6A2, 6A2A, 6A2B, 6A2C, 6B1, 6B3, 6B3A, 6B3B, and 6B4) depicts schematics of various exemplary electronic components.

FIGS. 14-20 provide additional views of an exemplary embodiment in an unfolding state.

DETAILED DESCRIPTION OF CERTAIN EXEMPLARY EMBODIMENTS

FIG. 1 depicts an exemplary embodiment in various states of unfolding. When completely folded, the device is compact and easily transportable, allowing the user to carry it in his pocket. By utilizing four folds, the keyboard (1) folds in onto itself, protecting the keys when not in use, and (2) folds into a square shape that is more easily pocketable than a rectangular shape.

Persons skilled in the art will appreciate that while the shape of the folded keyboard is important to being transportable and pocketable, other shapes and folding patterns also are within the scope and spirit of the present invention.

Figure 1A:
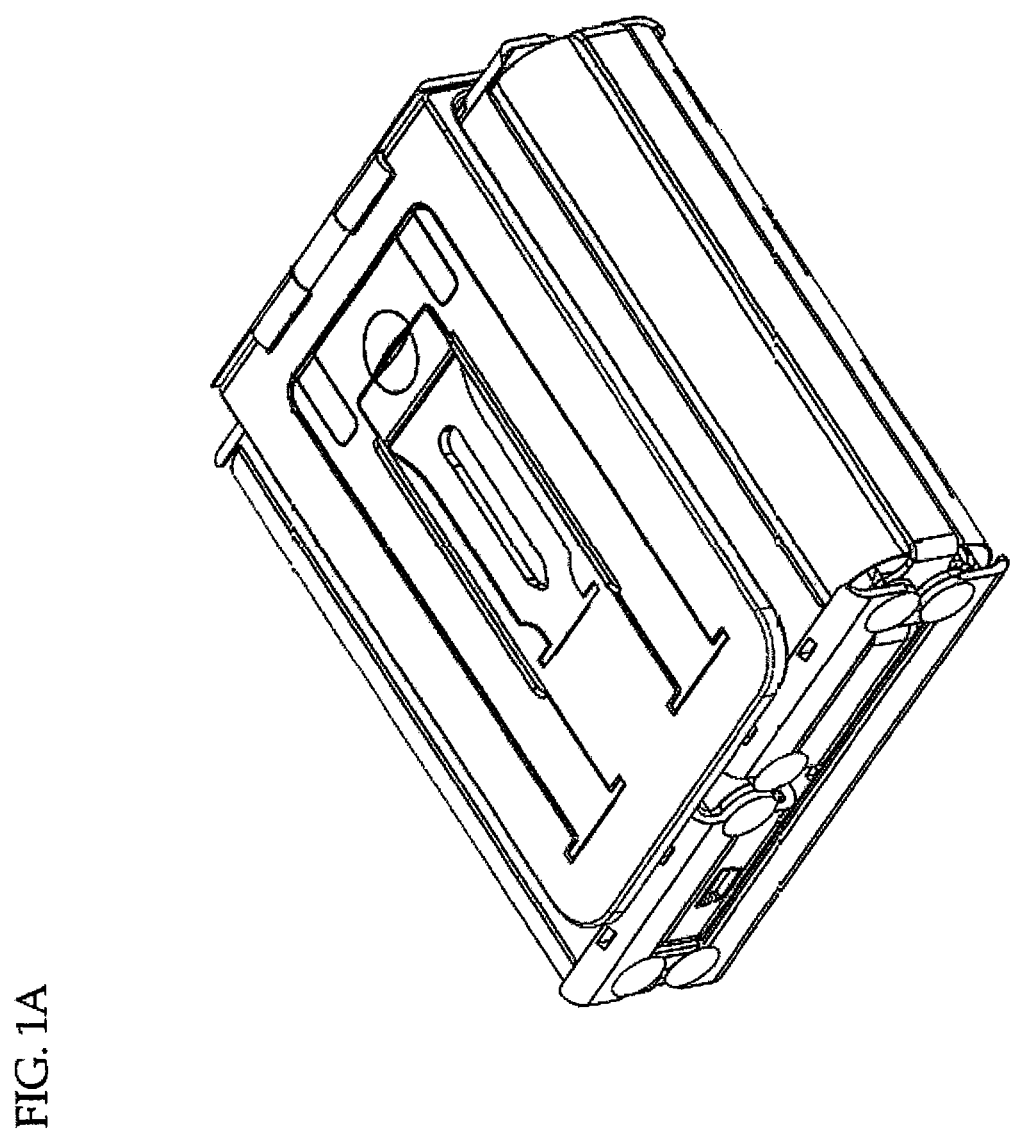
FIG. 1 (1A-1D) is an illustration an exemplary embodiment—folded, unfolding, and unfolded.
Figure 1B:
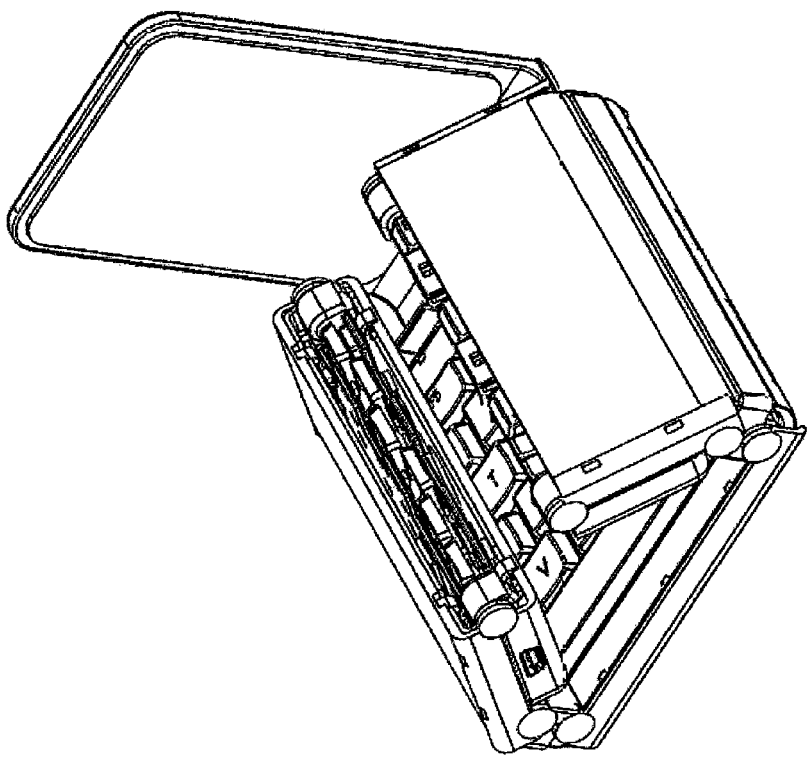
Figure 1C:
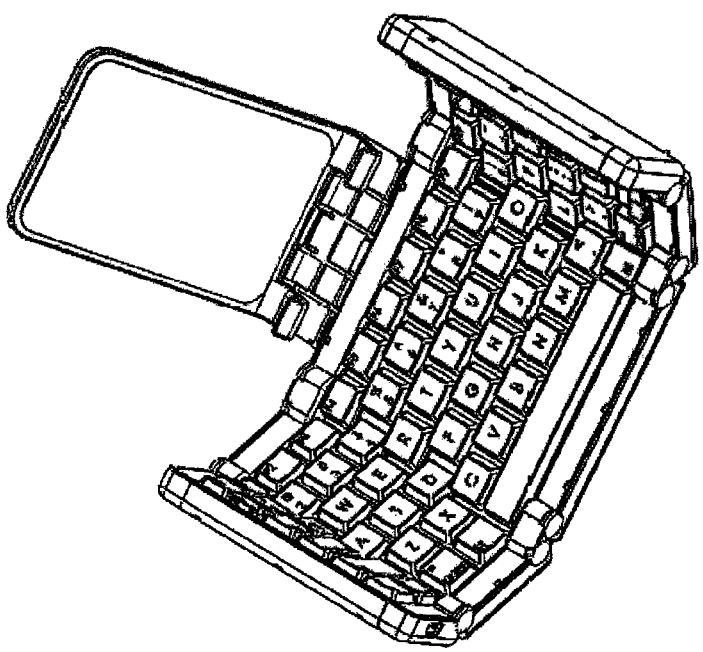
Figure 1D:
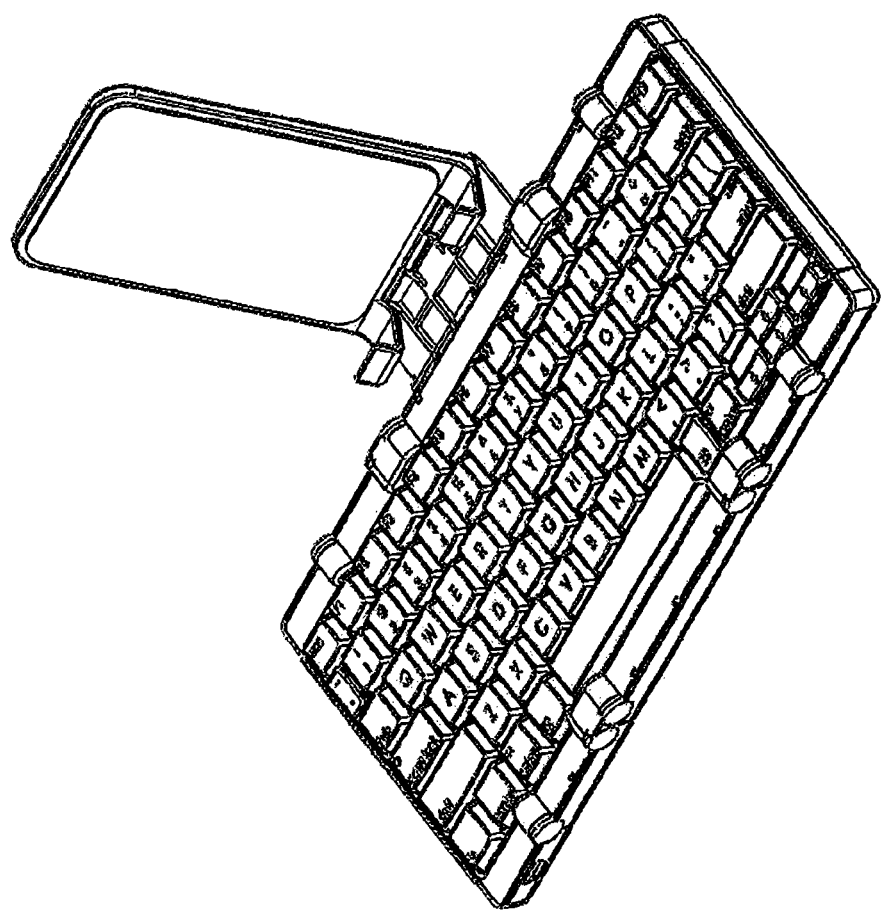
Figure 2:
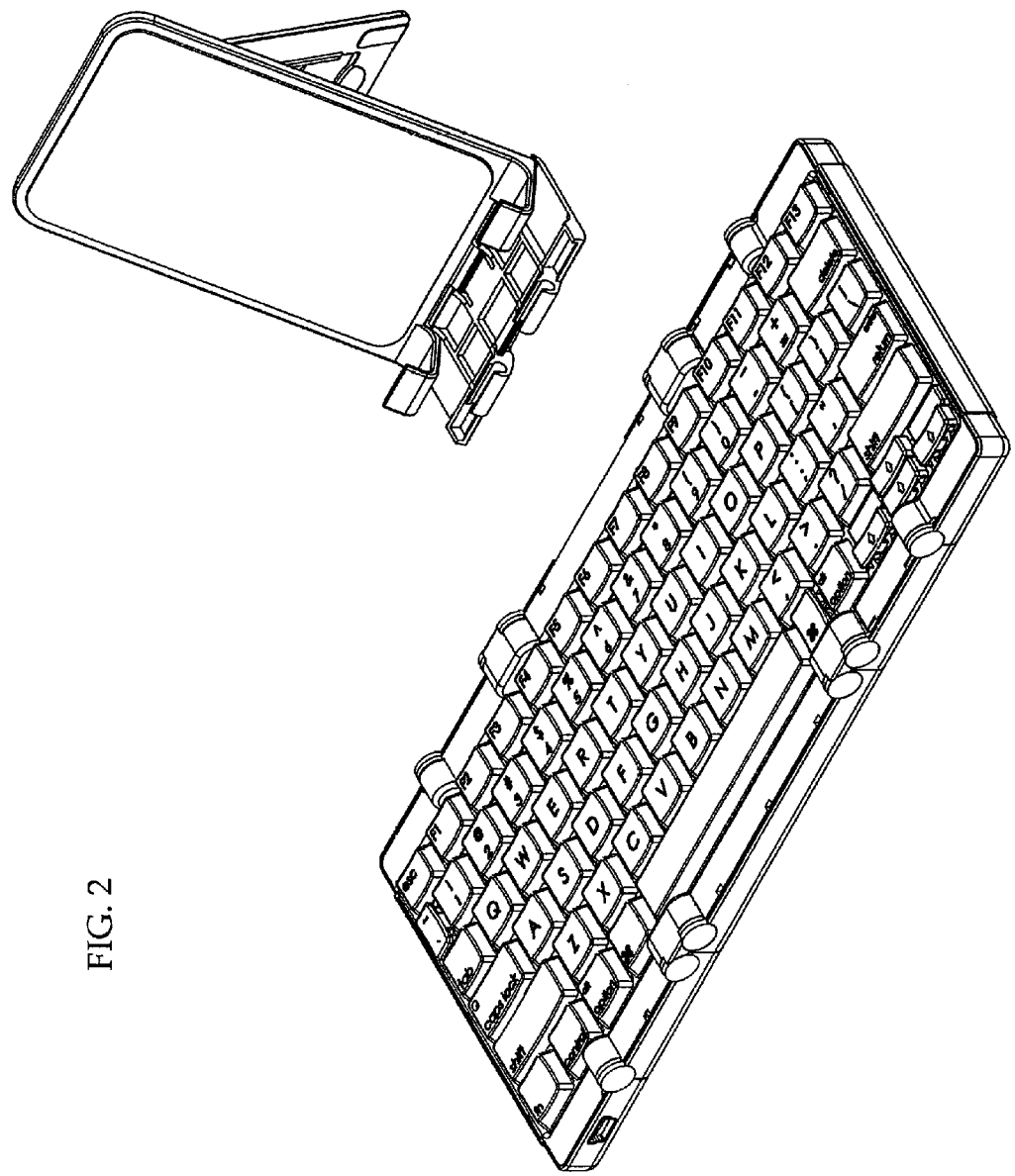
FIG. 2 is an illustration of certain components of an exemplary embodiment: (1) a keyboard, and (2) a cradle.

FIG. 2 shows two components of an exemplary embodiment: a keyboard and an attaching cradle (the terms "cradle" and "stand" are used interchangeably herein). The cradle preferably, but not necessarily, stows by wrapping itself around the keyboard so that the user can easily carry both pieces.

Figure 3:
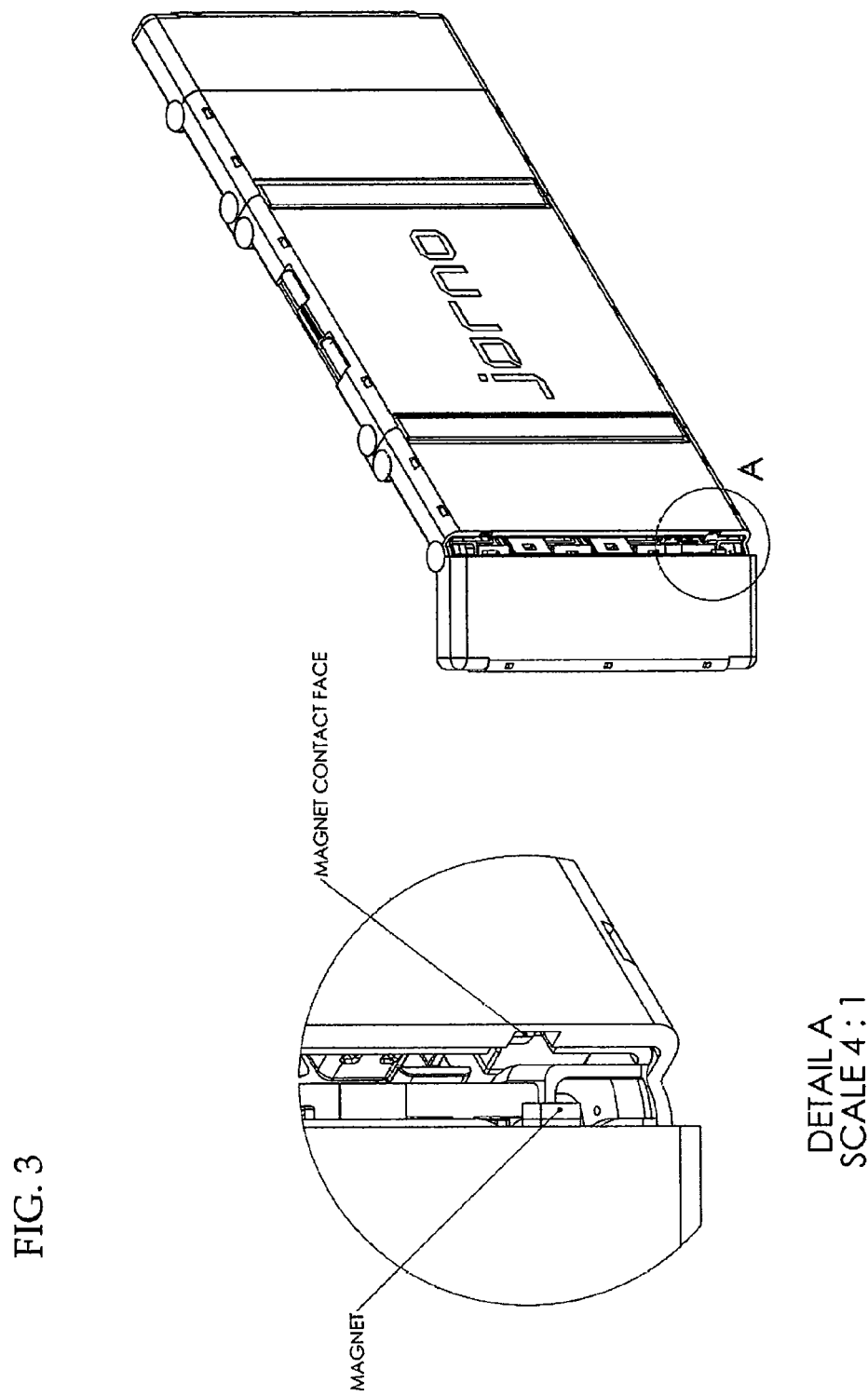
FIG. 3 is an illustration of the fold of an exemplary embodiment, showing magnets that secure the fold.

In an exemplary embodiment, there are magnets on each side of the folded parts to ensure that the keyboard stays rigid when unfolded (see FIG. 3).

Figure 4:
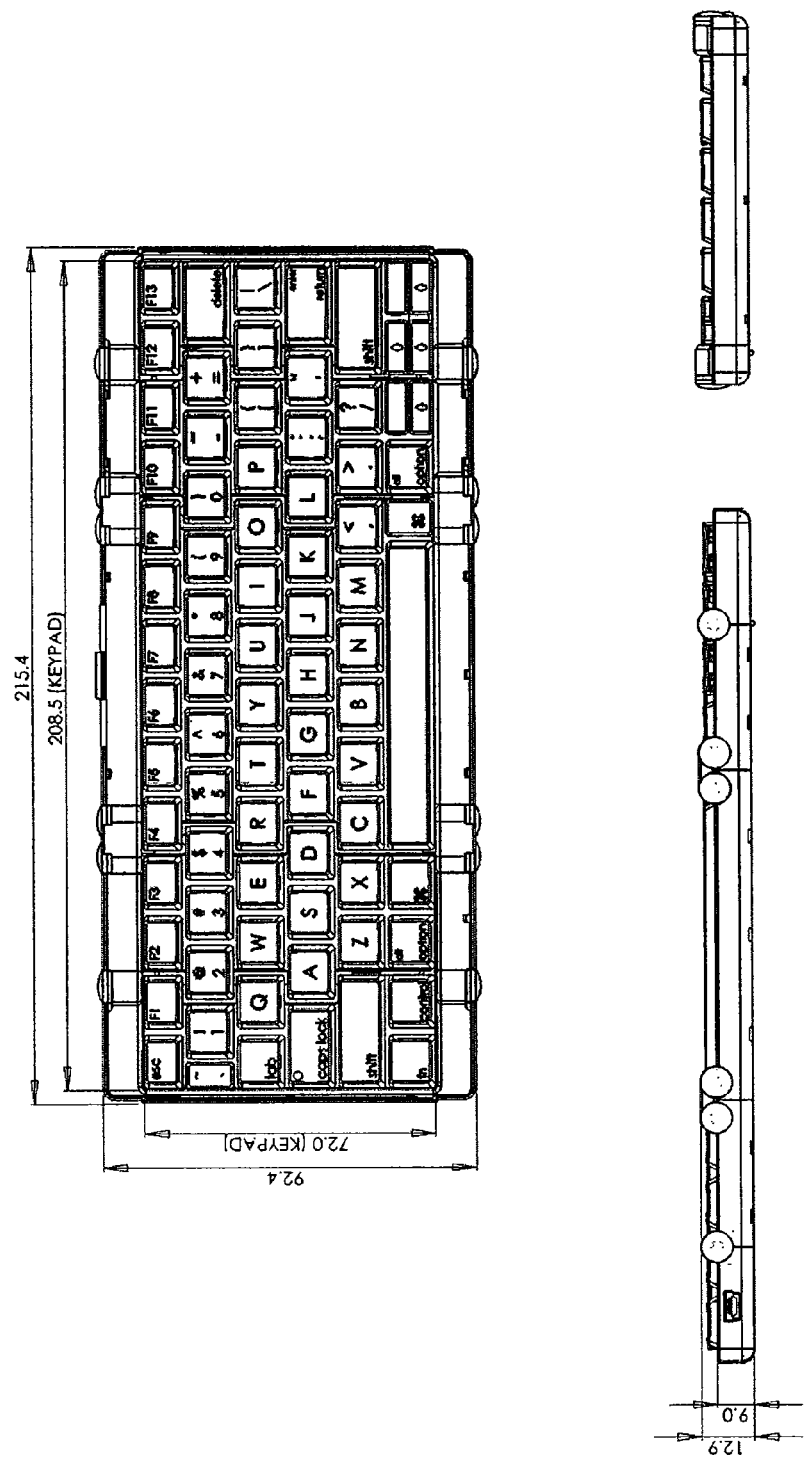
FIG. 4 depicts an overhead view of an exemplary keyboard embodiment.

FIG. 4 shows details of an exemplary keyboard embodiment. In this embodiment, the layout of the keys on the keyboard follows that of a standard American typewriter, with keys in a stair-step pattern (keys on a diagonal, rather than aligned horizontally/vertically). The four folds of the depicted embodiment accommodate this stair-step pattern so that users can type rapidly in a familiar key layout. The layout may of course be configured for any international typewriter configuration. Advantageously, the depicted design allows for a stair-step pattern key layout.

The keys and case of an exemplary keyboard may comprise plastic molded parts with printed letters on each key. In an exemplary embodiment, there is a stainless steel inner layer (exposed to the user in some parts of the external casing) to provide rigid strength and weight to counter balance the cradle when holding a portable computing device (without the cradle kick-stand engaged).

In an exemplary embodiment, keyboard hinges are spring-loaded with dampers to allow for automatic unfolding when the user unlatches the unit. The damping hinges preferably comprise an inner pivot pin and outer sleeve that are mated to their own separate moving body. The outer sleeve preferably is inserted over the inner pivot pin to create a hinging pivot point between the two moving bodies. The hinge preferably is sprung by a spring, which is connected to the outer sleeve and pivot pin at each end. The hinge movement caused by the spring force may be dampened by the friction of a high-viscosity grease between the pivot pin and outer sleeve contact surfaces.

FIG. 5 shows the detail of an exemplary cradle that stows against the keyboard. When unfurled, the cradle may detach from the keyboard for use as a freestanding cradle. The kickstand may fold out for use in freestanding operation, or when additional structural support is needed (e.g., for use with a heavy, bulky tablet computer).

In an exemplary embodiment, the cradle, when attached to the keyboard, preferably is centered on the keyboard, allowing a user easy focus on the device's screen. When freestanding, the cradle preferably allows a user to optimize placement of a device for improved productivity.

The cradle's angle preferably can be adjusted. There preferably is a snapping hinge that allows a user to snap and lock the cradle's angle into 1 of 8 different positions. The hinge preferably is strong enough to support mobile phones without unfurling the kickstand. For devices that weigh more than 8 ounces (such as tablet computers), the kickstand preferably is unfurled. The different positions may be created by a locking tab engaging teeth on a gear. The snap between positions is caused by the interference between the teeth on gear and a tooth on the locking tab.

Persons skilled in the art will appreciate that such a cradle enhances the keyboard's flexibility when the use is selecting an appropriate viewing angle for a device.

In an exemplary embodiment, the materials of the cradle are primarily plastic molded parts. Some parts (e.g., the back of the cradle, the foot of the cradle, and the foot of the kickstand) may be rubberized to allow for traction.

FIG. 6 is a schematic of exemplary electronics. Electronics preferably are housed inside the keyboard, allowing the apparatus to connect to portable computing devices, for example via a cabled USB connection or via a Bluetooth connection. The components preferably are mounted on a flexible printed circuit board. Exemplary components include:

Tack switch: to power on/off the unit
Reed switch: to power on/off the unit
AP131: a low voltage LDO from AnaChip
Lm3658: a lithium ion battery charger from National Semiconductor
MSP430f233: a processor from Texas Instruments
WT12: Bluetooth module from BlueGiga, utilizing the CSR
Bluetooth chip
A forty way zero insertion force connector from Neltron
Capacitors and resistors Those skilled in the art will appreciate that the listed and/or described components are for illustrative purposes only, and are not intended to limit the scope of the invention.

In the case of Bluetooth communication, firmware may be loaded onto a Bluetooth module that allows the keyboard to communicate via, for example, the Bluetooth HID protocol with any device that supports HID (such as portable computing devices, mobile phones, computers).

In an exemplary embodiment, power management software places the keyboard in multiple power modes as appropriate, such as power on (e.g., when a user presses a tack switch), power off (user presses and holds the tack switch), low power (when not in use). This software also may control LED indicators to display what power state the keyboard is in (e.g., on, off, low battery). When the unit is first powered on, the software may place the unit in "pairing mode," allowing a computing device (e.g., mobile phone) to discover and pair with the keyboard.

In an exemplary embodiment, the apparatus is configured to provide backup battery power to the portable computing device.

Figure 7:
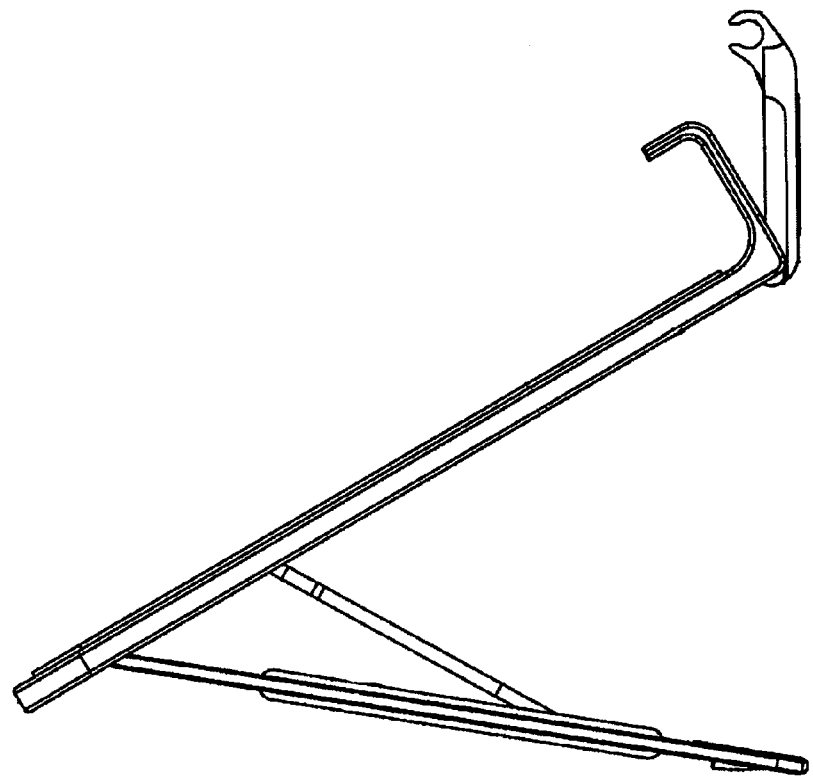
FIG. 7 is a side view of an exemplary stand embodiment.
Figure 8:
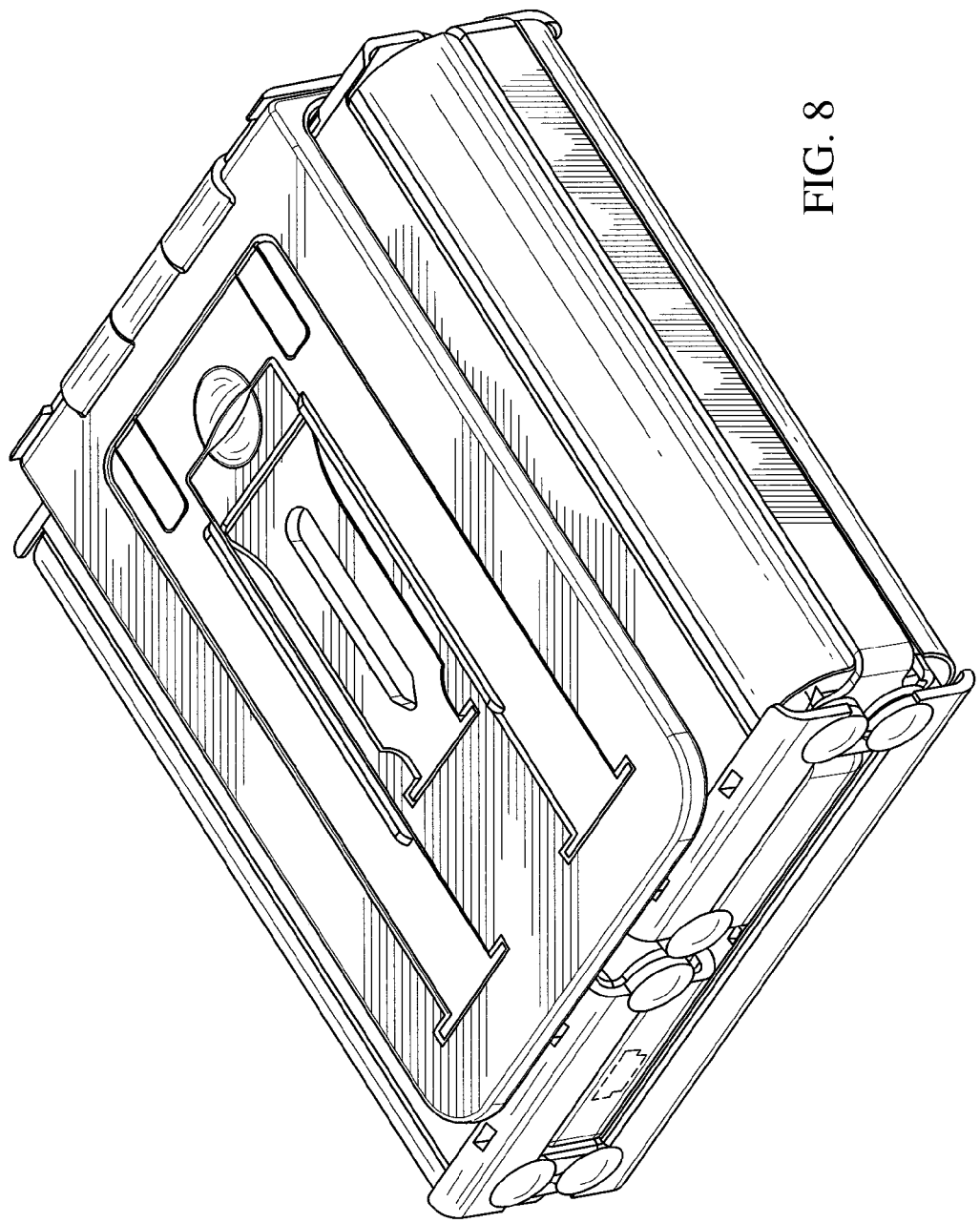
FIGS. 8-11 provide additional views of an exemplary embodiment in a folded state.
Figure 9:
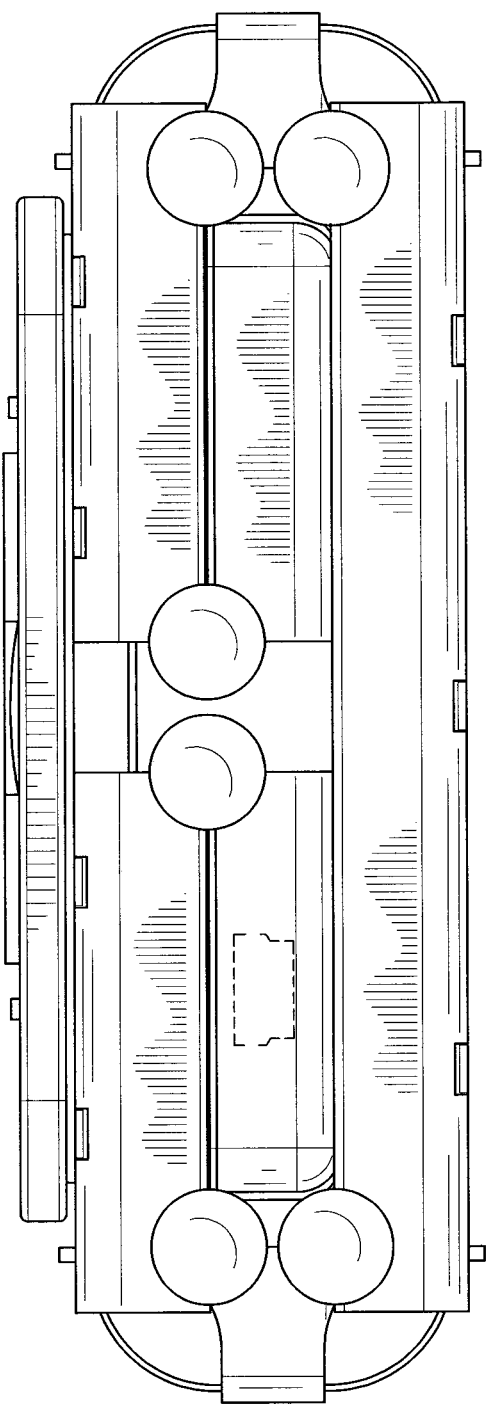
Figure 10:
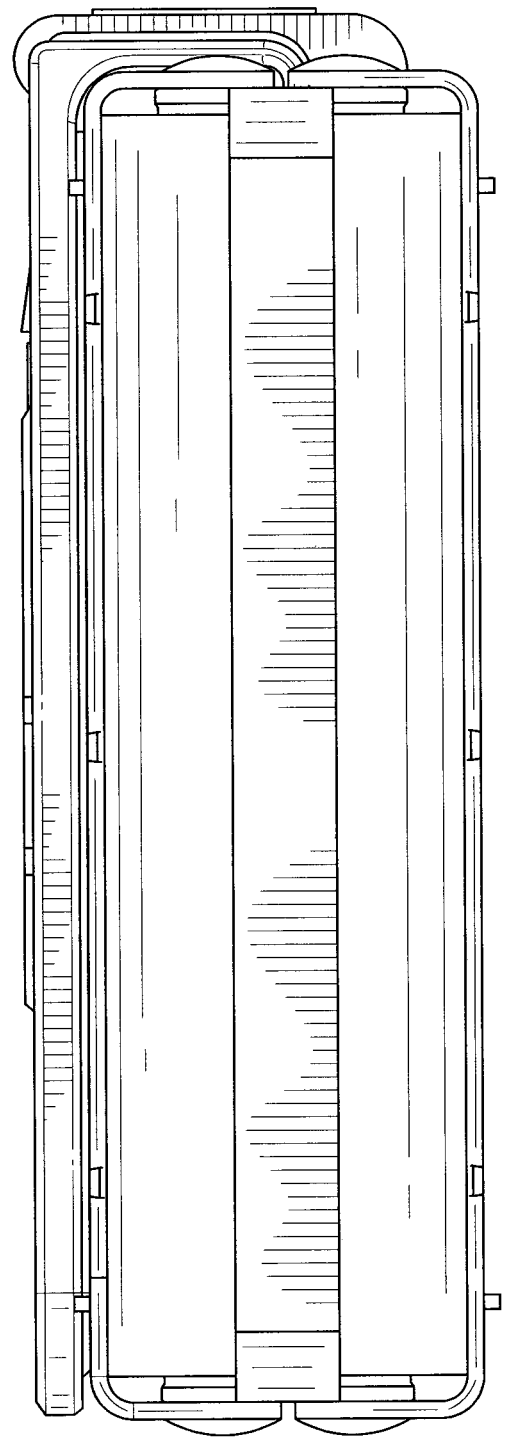
Figure 11:
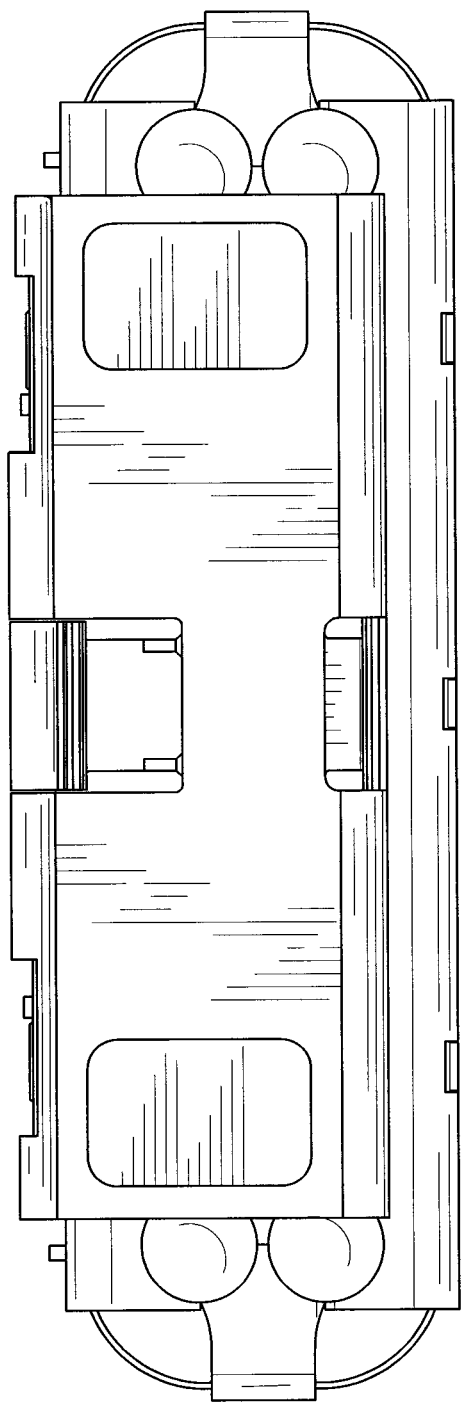

FIG. 7 is a side view of an exemplary stand embodiment.

FIGS. 8-11 provide additional views of an exemplary embodiment in a folded state.

Figure 12:
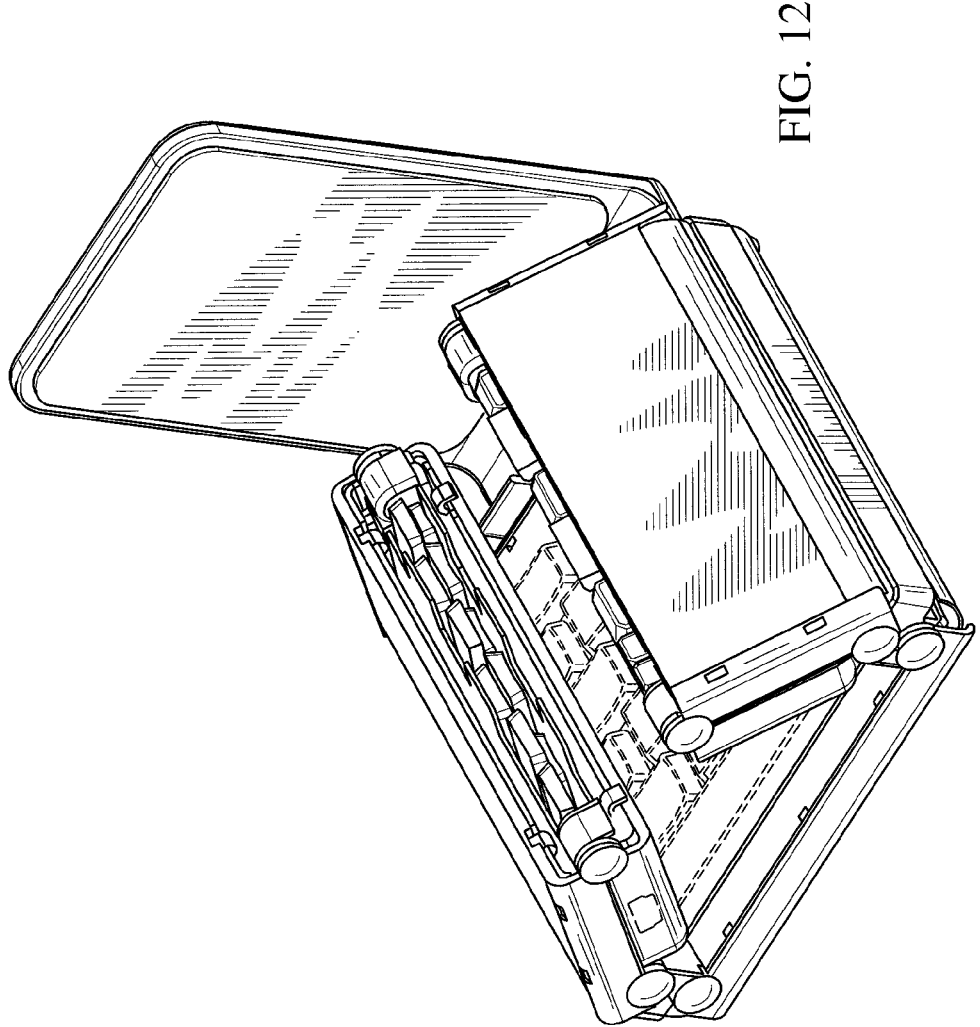
FIGS. 12-13 provide additional views of an exemplary embodiment in an unfolding state.
Figure 13:
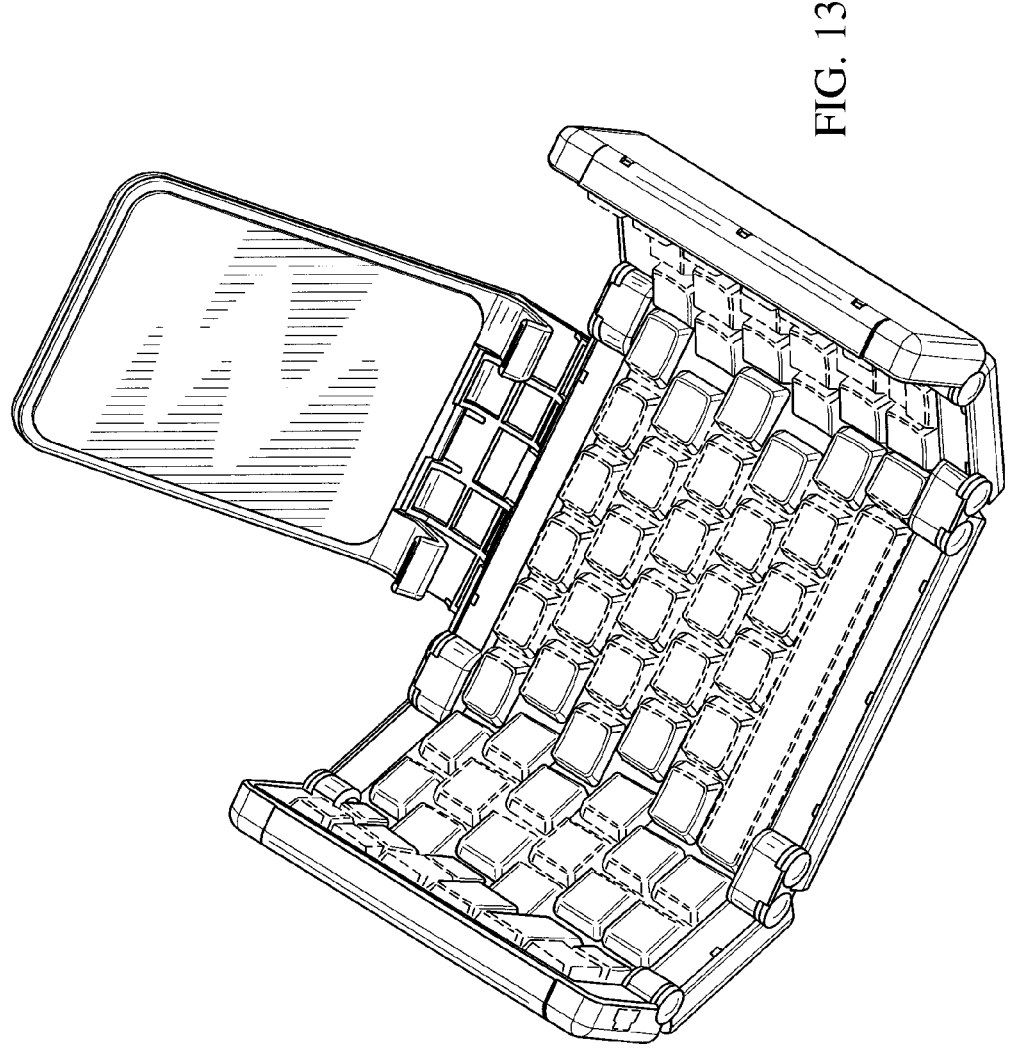
Figure 14:
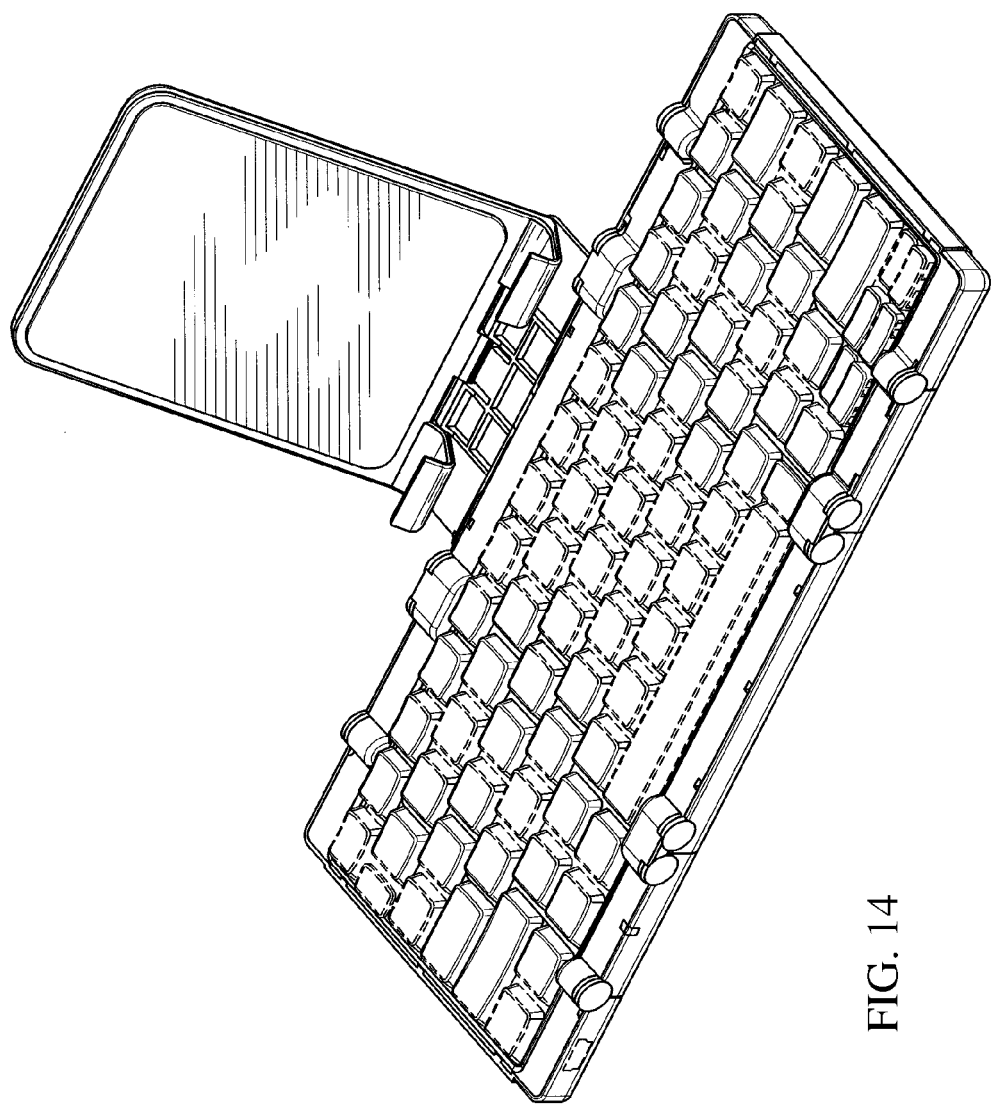
Figure 15:
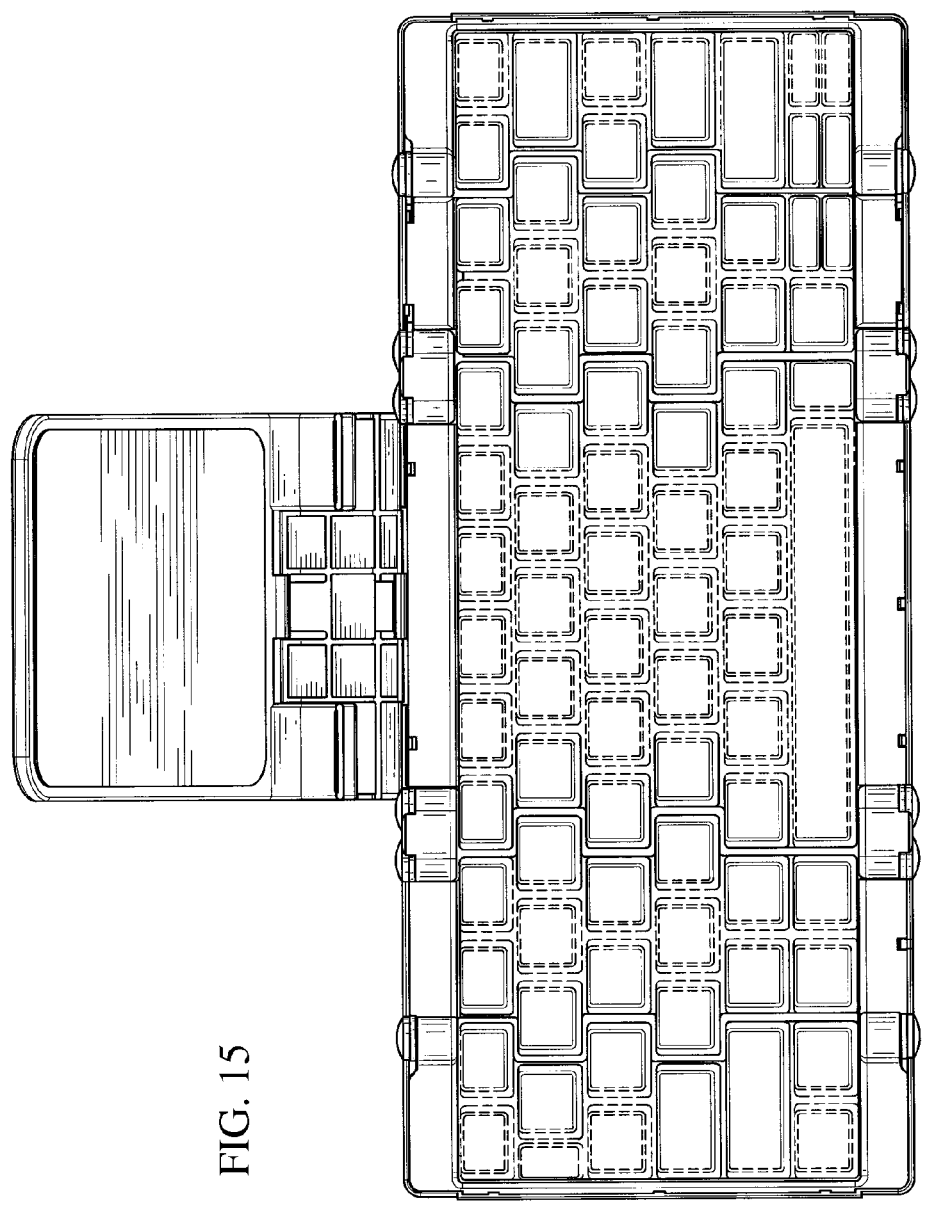
Figure 18:
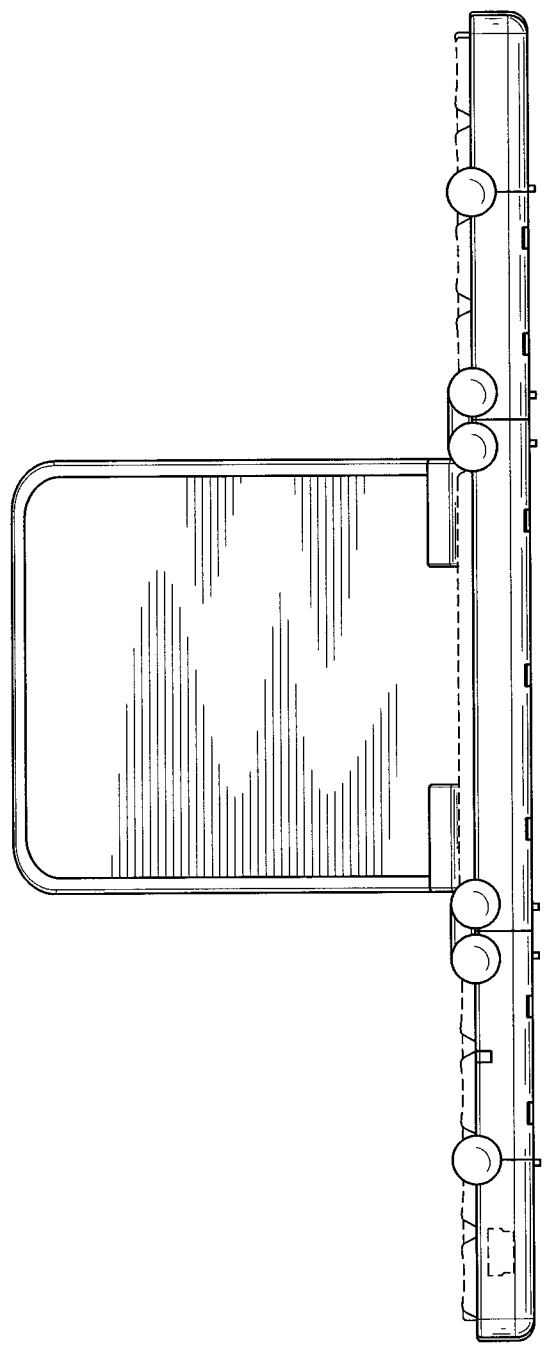
Figure 19:
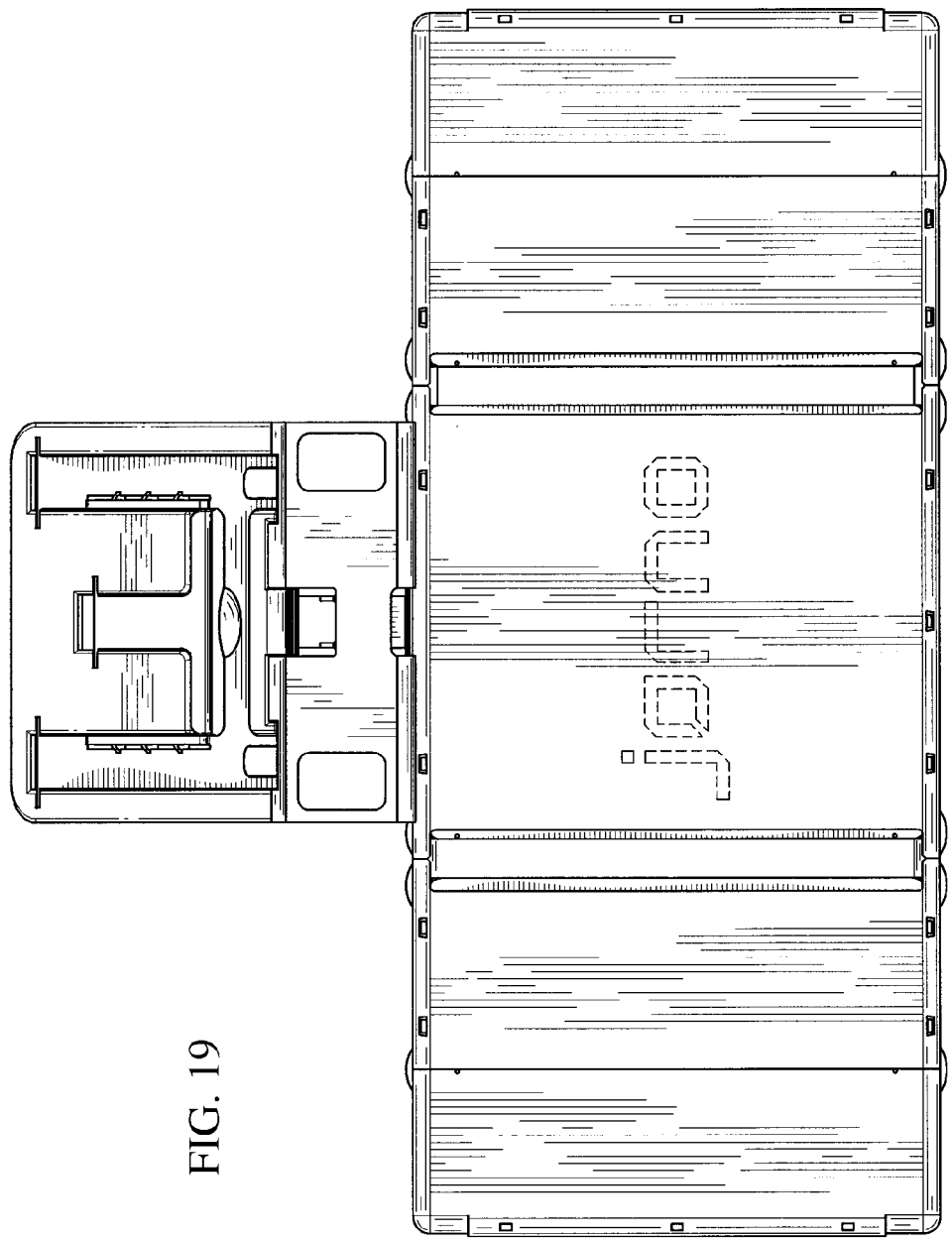
Figure 20:
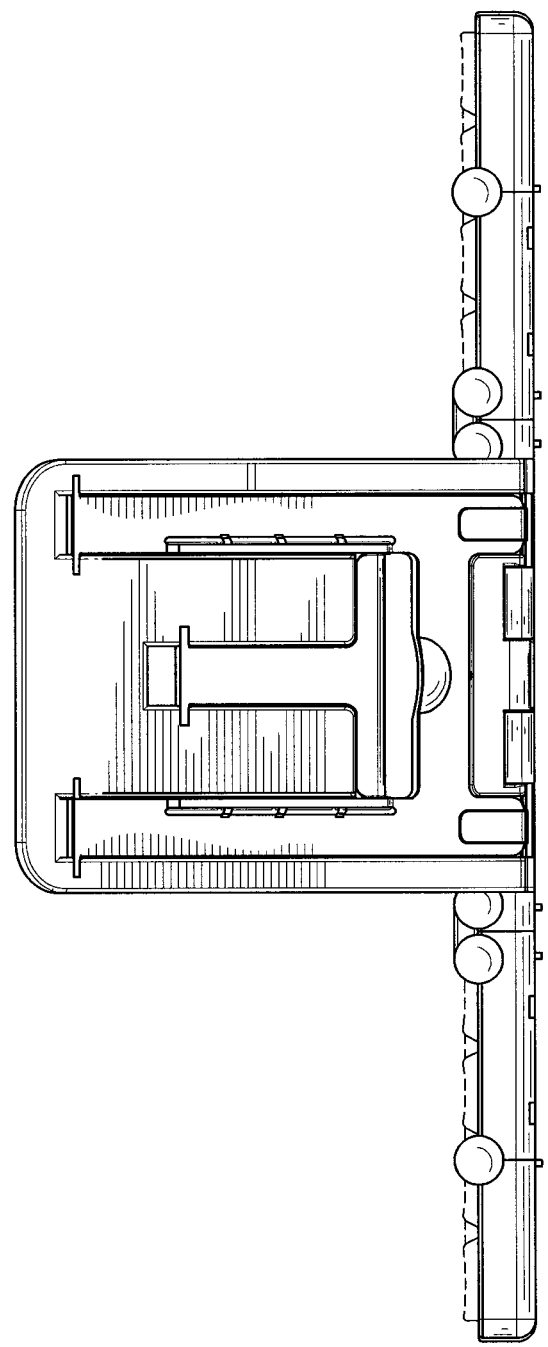
Figure 21:
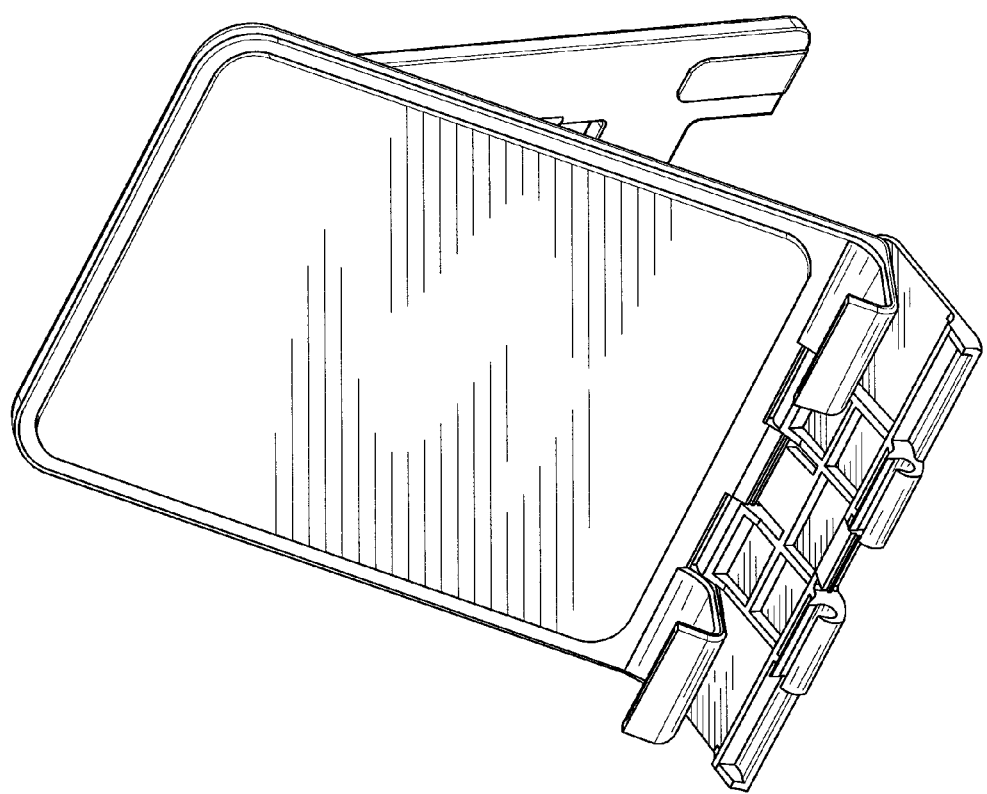
FIGS. 21-25 provide additional views of an exemplary stand embodiment.
Figure 23:
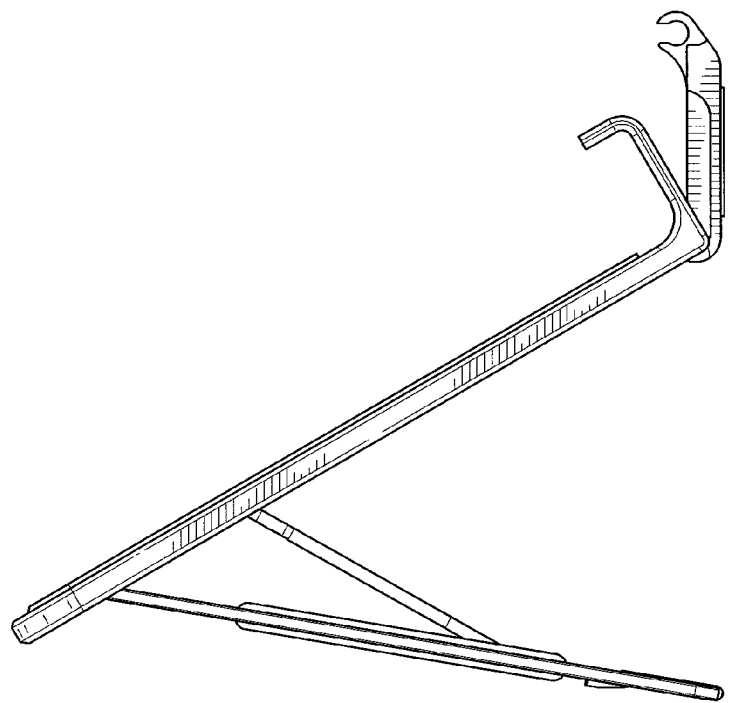
Figure 22:
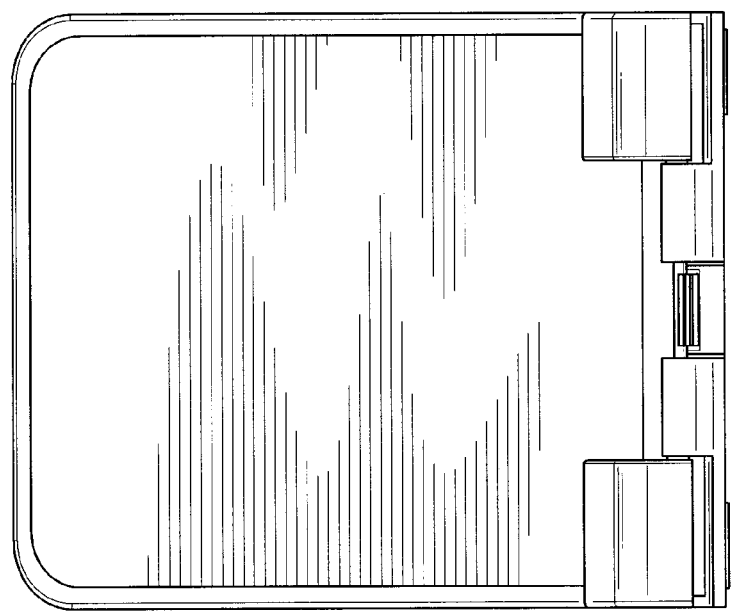
Figure 25:
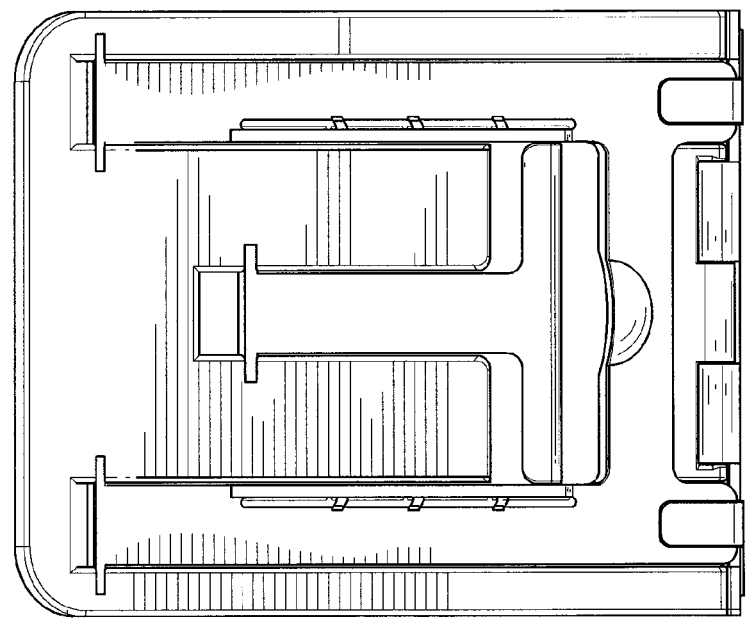
Figure 24:
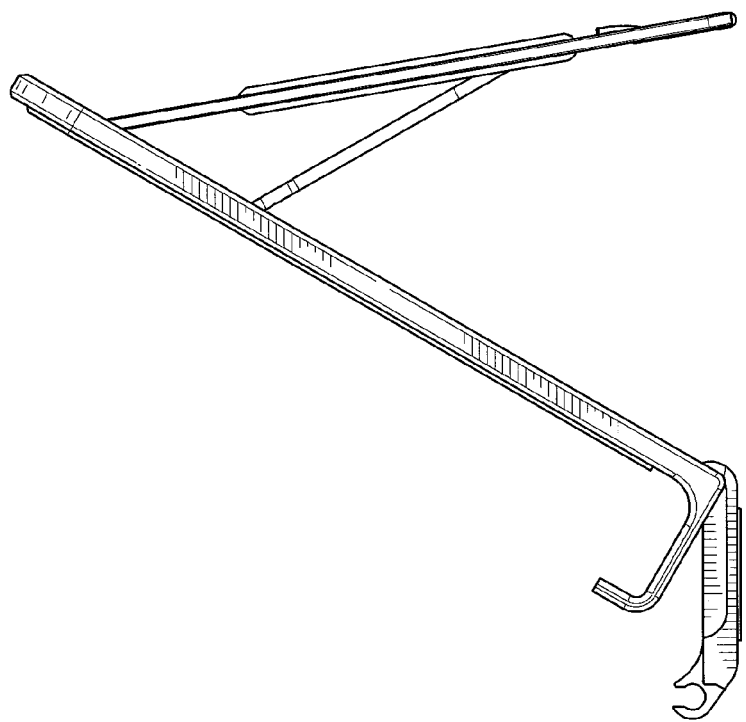

FIGS. 12-13 provide additional views of an exemplary embodiment in an unfolding state.

FIGS. 14-20 provide additional views of an exemplary embodiment in an unfolding state.

FIGS. 21-25 provide additional views of an exemplary stand embodiment.

Each separate mention herein of an "exemplary embodiment" should be understood to potentially, but not necessarily, refer to a separate embodiment.

While certain exemplary embodiments are described herein for the purpose of enabling a person of ordinary skill in the art to make and use the invention, it should be appreciated that the invention is not limited to those particular embodiment or their corresponding details. Any modification, variation, or equivalent arrangement within the scope of the attached claims should be considered to be within the scope of the invention.

I claim:

1. A keyboard apparatus comprising:
    a collapsible keyboard comprising five substantially rigid frames, said frames comprising a central frame, two end frames, and two intermediate frames, each intermediate frame located between one of said end frames and said central frame, and each of said frames having a front portion and a back portion, each said front portion having a plurality of keys such that the keys on all of the frames together form at least a a standard stair-step QWERTY keyboard;
    each pair of adjacent frames being relatively pivotably connected together along a folding axis, said folding axes being substantially mutually parallel;
    said collapsible keyboard being foldable about said folding axes between a deployed configuration, in which said keyboard is generally planar, and a collapsed configuration, in which each of said end frames is located between said central frame and a connected one of said intermediate frames, and
    said collapsible keyboard in said collapsed configuration being such that said front portions of said end frames face said front portions of said intermediate frames, and said front portion of said central frame faces said back portions of said end frames.

2. A keyboard apparatus as in claim 1, wherein, for each intermediate frame, said keyboard is foldable in the same direction on folding axes adjacent to said intermediate frame.

3. A keyboard apparatus as in claim 1, wherein each intermediate frame is pivotably connected to an end frame with a single hinge, and pivotably connected to said central frame with a double hinge.

4. A keyboard apparatus as in claim 3, wherein said single hinges are centered between said double hinges when said keyboard is in said collapsed configuration.

5. A keyboard apparatus as in claim 1, wherein each intermediate frame has a width, as measured between adjacent folding axes, that is less than one half of the width of said central frame.

6. A keyboard apparatus as in claim 1, each frame having a side wall shaped to nest with an adjacent side wall when said keyboard is in said deployed configuration, and each sidewall having either a magnet or a magnet contact face.

7. A keyboard apparatus as in claim 1, wherein each end frame has a width, as measured from an adjacent folding axis, that is less than the width of an adjacent intermediate frame.

8. A keyboard apparatus as in claim 1, wherein said plurality of keys are arranged in a standard ISO, ANSI, or JIS layout.

9. A keyboard apparatus as in claim 1, further comprising a cradle assembly.

10. A keyboard apparatus as in claim 9, wherein said cradle assembly is detachable from said collapsible keyboard.

11. A keyboard apparatus as in claim 9, wherein said cradle assembly is operable to cradle a cellphone and to cradle a large mobile computing or communication device.

12. A keyboard apparatus as in claim 9, wherein said cradle assembly comprises a stowing kickstand, a cradle foot, and a rubberized surface.

13. A keyboard apparatus as in claim 12, wherein said kickstand is adjustable to display a mobile computing or communication device at a plurality of angles.

14. A keyboard apparatus as in claim 9, wherein said cradle assembly is collapsible.

15. A keyboard apparatus as in claim 9, wherein said cradle assembly comprises a detachable hinge clip.

16. A keyboard apparatus as in claim 9, wherein said cradle assembly comprises a snap adjustment hinge mechanism.

17. A keyboard apparatus comprising:
    a collapsible keyboard comprising five substantially rigid frames, said frames comprising a central frame, two end frames, and two intermediate frames, each intermediate frame located between one of said end frames and said central frame, and each of said frames having a front portion and a back portion, each said front portion having a plurality of keys such that the keys on all of the frames together form at least a a standard stair-step QWERTY keyboard;
    each pair of adjacent frames being relatively pivotably connected together along a folding axis, said folding axes being substantially mutually parallel;
    a plurality of keys mounted on said frames, and
    said keyboard having a collapsed configuration such that said front portions of said end frames face said front portions of said intermediate frames, and said front portion of said central frame faces said back portions of said end frames.

18. A keyboard apparatus comprising:
    a collapsible keyboard comprising five substantially rigid frames, said frames comprising a central frame, two end frames, and two intermediate frames, each intermediate frame located between one of said end frames and said central frame and each of said frames having a front portion and a back portion, each said front portion having a plurality of keys such that the keys on all of the frames together form at least a a standard stair-step QWERTY keyboard;
    each pair of adjacent frames being relatively pivotably connected together along a folding axis, said folding axes being substantially mutually parallel;
    a plurality of keys mounted on said frames; and
    a collapsible cradle assembly detachable from said collapsible keyboard,
    said collapsible keyboard being foldable about said folding axes between a deployed configuration, in which said keyboard is generally planar, and a collapsed configuration, in which said end frames are located between said central frame and said intermediate frames, said collapsed configuration being such that said front portions of said end frames face said front portions of said intermediate frames, and said front portion of said central frame faces said back portions of said end frames, and said cradle assembly comprising a stowing kickstand, a cradle foot, and a rubberized surface.

19. A keyboard apparatus comprising:

a collapsible keyboard comprising five substantially rigid frames, said frames comprising a central frame, two end frames, and two intermediate frames, each frame having a front portion and a back portion, each said front portion having a plurality of keys, each intermediate frame located between one of said end frames and said central frame;

each pair of adjacent frames being relatively pivotably connected together along a folding axis, said folding axes being substantially mutually parallel; and a plurality of keys mounted on said frames and arranged such that the keys on all of the frames together form at least a standard stair-step ISO, ANSI, or JIS layout;

said collapsible keyboard being foldable about said folding axes between a deployed configuration, in which said keyboard is generally planar, and a collapsed configuration, in which said end frames are located between said central frame and said intermediate frames, said collapsed configuration being such that said front portions of said end frames face said front portions of said intermediate frames, and said front portion of said central frame faces said back portions of said end frames.

* * * * *